US 11,394,023 B2

United States Patent
Ofer et al.

(10) Patent No.: US 11,394,023 B2
(45) Date of Patent: Jul. 19, 2022

(54) PRE-LITHIATED ELECTRODE MATERIALS AND CELLS EMPLOYING THE SAME

(71) Applicant: CAMX Power, L.L.C., Lexington, MA (US)

(72) Inventors: David Ofer, Needham, MA (US); Jane Rempel, Arlington, MA (US); Suresh Sriramulu, Arlington, MA (US)

(73) Assignee: CAMX Power LLC, Lexington, MA (US)

(*) Notice: Subject to any disclaimer, the term of this patent is extended or adjusted under 35 U.S.C. 154(b) by 267 days.

(21) Appl. No.: 16/073,874

(22) PCT Filed: Feb. 9, 2017

(86) PCT No.: PCT/US2017/017208
§ 371 (c)(1),
(2) Date: Jul. 30, 2018

(87) PCT Pub. No.: WO2017/139477
PCT Pub. Date: Aug. 17, 2017

(65) Prior Publication Data
US 2019/0036118 A1 Jan. 31, 2019

Related U.S. Application Data

(60) Provisional application No. 62/293,129, filed on Feb. 9, 2016.

(51) Int. Cl.
*H01M 4/50* (2010.01)
*H01M 4/13* (2010.01)
(Continued)

(52) U.S. Cl.
CPC ............. *H01M 4/505* (2013.01); *H01M 4/04* (2013.01); *H01M 4/0459* (2013.01);
(Continued)

(58) Field of Classification Search
None
See application file for complete search history.

(56) References Cited

U.S. PATENT DOCUMENTS 5,743,921 A 4/1998 Nazri et al.
5,753,202 A 5/1998 Wang et al.
(Continued)

FOREIGN PATENT DOCUMENTS

CN 102820463 A 12/2012

OTHER PUBLICATIONS

Bohang Song et al: "Structural evolution and the capacity fade mechanism upon long-term cycling in Li-rich cathode material", Physical Chemistry Chemical Physics, vol. 14, No. 37, Jan. 1, 2012 (Jan. 1, 2012 ), p. 12875, XP055588314, ISSN: 1463-9076, DOI: 10.1039/c2cp42068f.
(Continued)

*Primary Examiner* — Barbara L Gilliam
*Assistant Examiner* — Angela J Martin
(74) *Attorney, Agent, or Firm* — Dinsmore & Shohl LLP; Weston R. Gould

(57) ABSTRACT

Provided are compositions, systems, and methods of making and using pre-lithiated cathodes for use in lithium ion secondary cells as the means of supplying extra lithium to the cell. The chemically or electrochemically pre-lithiated cathodes include cathode active material that is pre-lithiated prior to assembly into an electrochemical cell. The process of producing pre-lithiated cathodes includes contacting a cathode active material to an electrolyte, the electrolyte further contacting a counter electrode lithium source and applying an electric potential or current to the cathode active material and the lithium source thereby pre-lithiating the cathode active material with lithium. An electrochemical
(Continued)

cell is also provided including the pre-lithiated cathode, an anode, a separator and an electrolyte.

21 Claims, 11 Drawing Sheets

(51) Int. Cl.

| | | |
|---|---|---|
| *H01M 4/52* | (2010.01) | |
| *H01M 10/05* | (2010.01) | |
| *H01M 4/04* | (2006.01) | |
| *H01M 4/48* | (2010.01) | |
| *H01M 4/505* | (2010.01) | |
| *H01M 4/1391* | (2010.01) | |
| *H01M 4/525* | (2010.01) | |
| *H01M 4/131* | (2010.01) | |
| *H01M 10/052* | (2010.01) | |
| *H01M 4/485* | (2010.01) | |
| *H01M 10/0525* | (2010.01) | |
| *H01M 4/02* | (2006.01) | |

(52) U.S. Cl.
CPC ......... *H01M 4/131* (2013.01); *H01M 4/1391* (2013.01); *H01M 4/485* (2013.01); *H01M 4/525* (2013.01); *H01M 10/052* (2013.01); *H01M 10/0525* (2013.01); *H01M 2004/028* (2013.01)

(56) References Cited

U.S. PATENT DOCUMENTS

| | | | | |
|---|---|---|---|---|
| 6,159,636 | A | * | 12/2000 | Wang ................ H01M 10/0525 |
| | | | | 429/223 |
| 2013/0260254 | A1 | * | 10/2013 | Kren ........................ H01M 4/13 |
| | | | | 429/231.8 |
| 2013/0298386 | A1 | | 11/2013 | Tarascon et al. |
| 2013/0327648 | A1 | | 12/2013 | Grant et al. |
| 2015/0191841 | A1 | | 7/2015 | Grant et al. |
| 2015/0364795 | A1 | | 12/2015 | Stefan et al. |
| 2016/0028081 | A1 | | 1/2016 | Zhang et al. |

OTHER PUBLICATIONS

Yao X L et al: "Comparisons of graphite and spinel Li1.33Ti1.67O4 as anode materials for rechargeable lithium-ion batteries", Electrochimica Acta, vol. 50, No. 20, Jul. 25, 2005 (Jul. 25, 2005), pp. 4076-4081, XP004971778, ISSN: 0013-4686, DOI: 10.1016/J.ELECTACTA. 2005.01.034.

Extended European Search Report Application No. 17750763.9 dated May 22, 2019.

* cited by examiner

PRE-LITHIATED ELECTRODE MATERIALS AND CELLS EMPLOYING THE SAME

CROSS-REFERENCE TO RELATED APPLICATION

This application claims priority of U.S. Patent Application Ser. No. 62/293,129 filed Feb. 9, 2016, the disclosure of which is incorporated herein by reference.

FIELD

This disclosure relates to secondary batteries. Provided are pre-lithiated cathode materials and electrodes that address prior issues of irreversible capacity and columbic inefficiency, as well as cells incorporating such materials and methods of manufacture.

BACKGROUND

Lithium-ion cells are typically made from electrode materials in their discharged states, with all the lithium available for cycling in the cell originating from the as-synthesized cathode active material. When the cell is charged for the first time, all the lithium that can be reversibly extracted from the cathode (or positive electrode) by electrochemical oxidation is transferred to the anode (or the negative electrode). However, the initial reductive electrochemical processes undergone by low potential, high-energy lithium-ion anode materials used in high-energy lithium-ion cells are not entirely reversible. Irreversible electrolyte reduction processes consume both charge and active lithium to form passivating films on the anode surface, known as solid electrolyte interphase (SEI), that prevent further reduction of the electrolyte. The charge and cyclable lithium lost to these passivation processes directly diminish the cell's cycling capacity, and thus its energy density. As a result, favored anode materials used in traditional cells have low surface areas to minimize the irreversible losses associated with surface passivation. In the graphitic carbon anode materials that are ubiquitous in current high energy Li-ion cells, these passivating processes are largely completed after the first lithiation or after the first few charge/discharge cycles, in large part because the graphitic anodes undergo relatively small volume changes (12% expansion for fully lithiated graphite) as they are cycled. This small change in surface area ensures that the passivating films continue to adhere to the anode surface and prevent further electrolyte reduction.

Graphitic carbon anode materials, however, have relatively limited capacity that largely limits the energy density increases obtainable in Li-ion cells to those that can be achieved by improved cell designs. In order for substantial further Li-ion cell energy density increases to be achieved, higher energy density next-generation anode materials must be implemented. The most promising of such next-generation materials are based on elements that form high capacity alloys with Li, of which Si receives by far the greatest volume of R&D activity. However, when elemental Si undergoes initial full lithiation, its volume expands by nearly 300%, which greatly increases its surface area and results in high irreversible consumption of Li by surface passivation processes. This irreversible Li consumption reduces the cell's cyclable capacity and energy density. Furthermore, continued large volume changes during cycling serve to destabilize the passivating surface films, resulting in low cycling efficiency and irreversibly consuming more lithium, ultimately resulting in cell failure. The cycling efficiency and cycle life of Si-based anode materials can be substantially increased, albeit at some cost to specific energy, by using a silicon oxide, $SiO_x$, active material, rather than elemental Si. However, such oxide-based anodes introduce even larger $1^{st}$ cycle irreversible capacity because it is believed that the oxide is irreversibly reduced to $Li_2O$ and various lithium silicates in addition to Si, which undergoes reversible electrochemical Li—Si alloy formation. These issues of coulombic inefficiency arising from the interaction of SEI formation, large volume changes, and irreversible chemical transformations also apply to other elements that form high capacity alloys with Li, such as Ge, Sn, and Al, as well as to their blends with more conventional anode materials such as graphite and their compounds or composites with various other elements.

A number of means for adding extra Li to Li-ion cells to compensate for anode irreversible Li consumption have been identified. Stabilized lithium metal powder (SLMP®) has been developed by FMC Corp., and is used by adding the powder to the anode or negative electrode either as part of the anode slurry prior to electrode coating, or by post-application to the coated electrode. SLMP has some very attractive attributes, but its use also presents some significant problems. It is stable enough to be stored and processed in an ultra-low humidity (−40° C. dew point) dry room, but not in ambient air. It is not compatible with standard water or NMP solvents used in conventional anode slurries. Its particle size is relatively large (e.g., 10-20 µm), and therefore it generally must be well dispersed when incorporated in or applied to the anode in order to avoid over-lithiation. The dispersion of large SLMP particles in turn creates difficulties in uniformly distributing the extra Li throughout the anode, and long equilibration times are required once the cell is assembled. This problem is worse for crystalline Si anode material having a 2-phase heterogeneous initial lithiation process that occurs on a potential plateau very close to the Li metal potential. In partially pre-lithiated crystalline Si electrodes, oxidation of the SLMP and homogeneous distribution of the extra Li cannot be achieved before beginning to cycle the cell making it very difficult to avoid subsequent formation of internal short circuits.

Electrochemical methods for lithiating anodes are being developed. Reel-to-reel web processing of finished anodes has been disclosed, and most recently, technologies to perform such processing at industrial scale are undergoing commercial development. In this approach, the web is fed through an electrochemical bath while being electrically addressed to drive the desired level of Li insertion. The approach has important potential to yield a highly controlled and scalable process. However, it also presents significant problems. Low-potential pre-lithiated anodes are extremely air sensitive and potentially dangerous, and cannot be handled outside a dry room. The electrochemical pre-lithiation process requires immersion in liquid Li salt-containing electrolytes followed by rinsing with volatile solvent and drying, which would greatly increase the already very costly air-handling requirements for a dry room. As such, the machines being developed to perform electrochemical pre-lithiation are sealed automated units for installation in areas with less rigorous environmental controls, and they must have provisions for packaging and transferring a pre-lithiated anode web to the dry room without ambient atmosphere exposure. Even when in the dry room, once the pre-lithiated anode is fully exposed to the dry room atmosphere by unrolling the web, it must be rapidly assembled in cells to avoid significant degradation. Another complication of the electrochemical anode pre-lithiation approach is that it necessarily involves formation of SEI on the anode, and this consideration has important consequences for the pre-lithiation process's electrolyte solution and rinse conditions as well as for the subsequent processing and handling of the pre-lithiated web. Lastly, when Li alloy-based anodes such as Si are electrochemically pre-lithiated, the large volume changes undergone by the active materials create large stresses in the electrodes, making the resulting pre-lithiated webs mechanically very fragile and often limiting the degree of pre-lithiation that can be successfully implemented.

Approaches to pre-lithiating Li-ion cells by pre-lithiating the cathode or the positive electrode have also been disclosed. One such approach involves adding sacrificial Li salts to the cathode. Upon first charge, these salts' anions are oxidized, making the Li counter-ion available for insertion into the anode. Such salts discovered to date, however, presented numerous chemical and engineering difficulties, and there is no known commercial implementation of this approach. Another cathode pre-lithiation approach involves mixing chemically synthesized high Li-content cathode materials such as $Li_2MnO_3$, $Li_4Co_4O_6$ or $Li_2NiO_2$ with conventional Li-ion cathode materials such as $LiMn_2O_4$ or those of the layered-structure $LiMO_2$ type. Although such chemically-synthesized high Li-content cathode materials provide very high first delithiation capacity, they do not cycle with high enough capacity and voltage to advantageously be used as the main cathode material of the cell and must be substituted for some of that main cathode material, thus still limiting the cell's cycling energy.

As such, there remains a need for new pre-lithiation technologies and electrode active materials and cells incorporating the same to improve cell characteristics traditionally lost through irreversible capacity losses suffered during initial charge or cycling.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

It is a first object to provide a chemically or electrochemically pre-lithiated cathode for use in an electrochemical cell. The chemically or electrochemically pre-lithiated cathodes address the issues for improving overall cell characteristics of lithium-ion cells into which they are incorporated. The chemically or electrochemically pre-lithiated cathode includes a cathode active material where the cathode active material includes the chemical formula $Li_{1+a}M_xO_y$, and is pre-lithiated prior to assembly into the final electrochemical cell. Optionally, a is greater than 0 and less than or equal to 1. Optionally, x is greater than zero. Optionally, y is greater than or equal to 2 and less than or equal to 6. M is one or more transition metals, Al, B, Mg or a combination thereof. In some aspects, the pre-lithiated cathode active material has the chemical formula: $Li_{1+a}Ni_xCo_yMn_zO_2$, where, $0<a\le1$, $0\le x\le1$, $0\le y\le1$, and $0\le z\le1$ wherein at least one of x, y, or z is non-zero. In some aspects, the pre-lithiated cathode active material has the chemical formula: $Li_{1+a}D_vNi_xCo_yMn_zA_wO_2$ where, $0<a\le1$, $0\le x\le1$, $0\le y\le1$, $0\le z\le1$, $0\le w\le0.15$, $0\le v\le0.10$, and at least one of x, y, or z is non-zero. Dopant A is one or more elements from the group of elements including: Sc, Ti, V, Cr, Fe, Cu, Zn, Al, Ga, Ge, As, B, and Mg, and dopant D is one or more elements from the group of elements including: Be, Na, Mg, K, Ca, Sr, Ni, Co, Mn, Sc, Ti, V, Cr, Fe, Cu, Zn, Al, Ga, Ge, B, and As.

It is another object to provide a process of producing a pre-lithiated cathode. The process includes contacting a cathode active material to an electrolyte. The electrolyte further contacts a counter electrode lithium source. The process also includes applying an electric potential or current to the cathode active material and the lithium source thereby pre-lithiating the cathode active material with lithium. In some aspects the process may be performed using a reel-to-reel process where a cathode web is drawn through an electrolyte bath at a predetermined speed while the lithium source and cathode web are subject to a current density of 1-20 $mA/cm^2$, optionally 10 $mA/cm^2$. In some aspects, the process may also be performed by assembling an electrochemical cell with cathode active material and a counter electrode. The electrochemical cell is then subjected to pre-lithiation voltage or current thereby pre-lithiating the cathode active material. The electrochemical cell may then be disassembled and the cathode active material rinsed and dried in preparation for assembly into a final electrochemical cell.

BRIEF DESCRIPTION OF THE DRAWINGS

The embodiments set forth in the drawings are illustrative and exemplary in nature and not intended to limit the subject matter defined by the claims. The following detailed description of the illustrative aspects can be understood when read in conjunction with the following drawings, where like structure is indicated with like reference numerals and in which:

DETAILED DESCRIPTION

Figure 1:
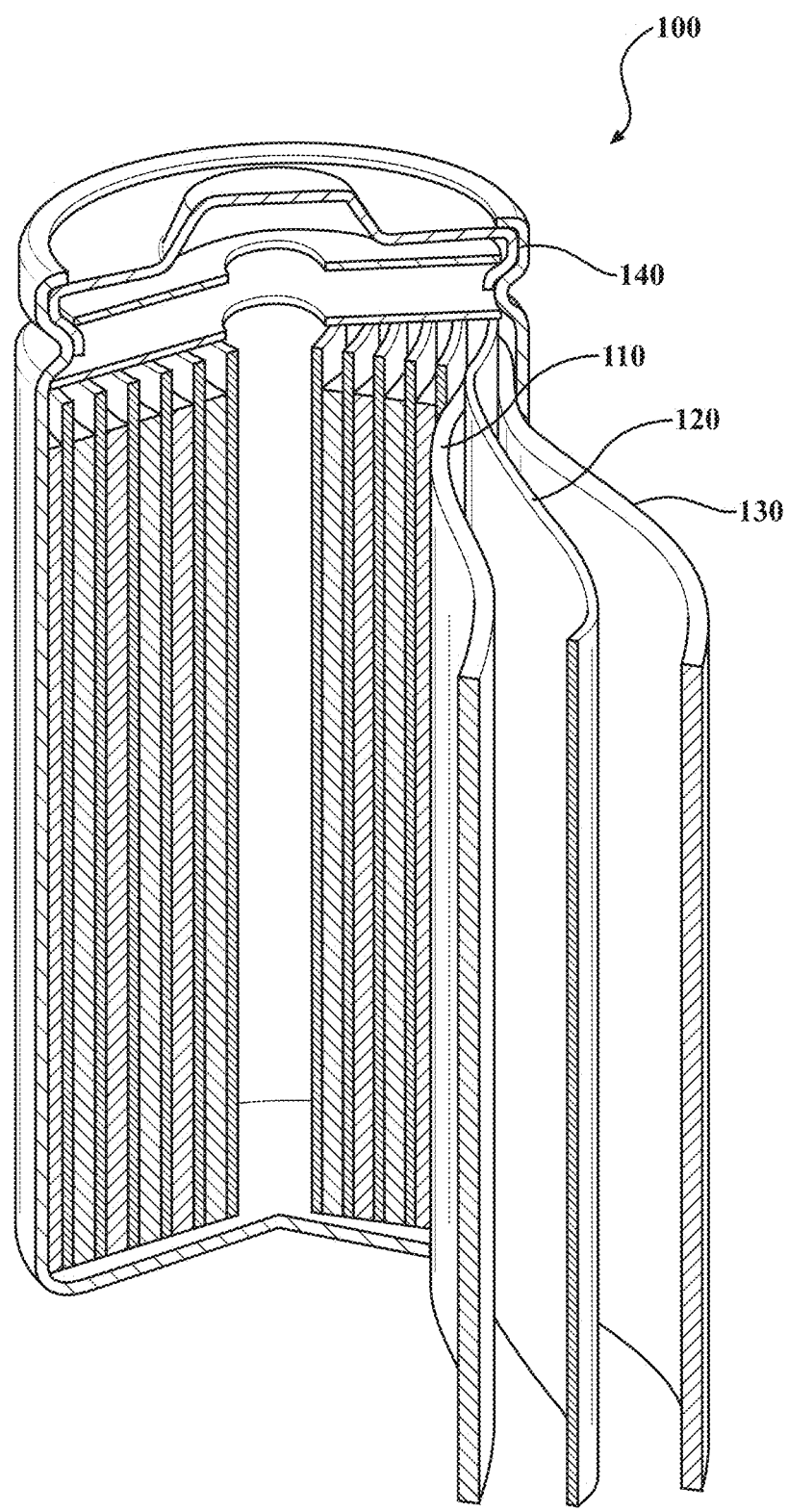
FIG. 1 is a cross-sectional view of an example electrochemical cell according to one or more aspects described herein.

This disclosure is based on the discovery that cathode materials that are chemically or electrochemically pre-lithiated as described herein can themselves be used to supply extra lithium into a lithium ion cell. As such, provided are compositions, systems, and methods of making and using pre-lithiated cathodes in lithium ion secondary cells as the means of supplying extra lithium to the cell, thereby overcoming the above-described limitations of other Li-ion cell lithiation technologies. Pre-lithiation of the cathode (or positive) active material or electrode as provided herein can be achieved by chemical or electrochemical means. This document further discloses electrochemical pre-lithiation of active cathode material prior to assembly of the cathode electrode into the final Li-ion cell.

The following description of particular aspect(s) is merely exemplary in nature and is in no way intended to limit the scope of the disclosure, its application, or uses, which may, of course, vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that when an element is referred to as being "on" another element, it can be directly on the other element, or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein the term "pre-lithiated" means the chemical or electrochemical deposition or absorption of lithium into a lithium containing electrochemically active material for use as a positive electrode for an electrochemical cell such as a lithium-ion cell, or electrode including a lithium containing electrochemically active material such that the lithium content of the active material or electrode including an active material is increased relative to the lithium content of the as-synthesized active material or electrode formed with the as-synthesized active material. The term "pre-lithiated" excludes lithium, lithium salts, lithium oxides, lithium hydroxides or lithium peroxides sintered, mixed, or high-energy milled with a transition metal compound, or oxides, hydroxides or salts of a transition metal compound. The term "pre-lithiated" excludes lithium, lithium salts, lithium oxides, lithium hydroxides or lithium peroxides sintered, mixed, or high-energy milled with a positive electrode active material for an electrochemical cell, more specifically for a lithium-ion cell.

As used herein, "absorbing" can mean: intercalation or insertion or conversion alloying reactions of lithium with the active materials.

As used herein, "desorbing" can mean: de-intercalation or de-insertion or conversion de-alloying reactions of lithium with the active materials.

As used herein, in the context of the Li-ion cell, cathode means positive electrode and anode means the negative electrode.

As used herein an "active material" is a material that participates in electrochemical charge/discharge reaction of an electrochemical cell such as by absorbing or desorbing lithium.

Provided are lithium ion electrochemical cells that include one or more electrodes that include additional lithium present within the electrode active material above and beyond the amount of lithium included in the electrode active material during its synthesis. Referring to FIG. 1 a cross-section of an example secondary electrochemical cell is depicted. The electrochemical cell 100 generally comprises a cathode 110, a separator 120, an anode 130 and electrolyte solution within a cell case 140, optionally, without limitation, a steel-can or pouch. The separator 120 is interposed between the cathode 110 and the anode 130. The cathode 110 and anode 130 comprise an electrode active material capable of absorbing and desorbing lithium under the conditions of operation of an electrochemical cell. Although this disclosure is directed to Ni-, Co-, or Mn-containing cathode active materials, the processes and materials as described herein are equally applicable to other materials capable of absorbing and desorbing lithium, as will be recognized by one of ordinary skill in the art. An electrochemical cell 100 may include an anode 130 comprising an anode material, a cathode 110 comprising a cathode material that has been pre-lithiated, and a lithium-ion containing electrolyte. A cathode 110 optionally includes one or more lithium metal oxide active materials with the general formula $Li_{1+a}M_xO_y$, wherein M is optionally a transition metal or other element, optionally Ni, Co, Al, V, Ti, B, Zr, Mn, Mg or any combination thereof, and a, x and b are selected such that the formula is satisfied, optionally where y is 2, optionally where y is 3, optionally where y is 4, optionally where y is 5. Optionally, M is Ni, Co, Al, V, Ti, B, Zr, Mg or any combination thereof, and a, x and y are selected such that the formula is satisfied, optionally where y is around 2. In some aspects, a is greater than zero and equal to or less than 1. Optionally, a is greater than 0.02 and equal to or less than 1. Optionally, a is greater than 0.3 and equal to or less than 1. Optionally, a is greater than 0.4 and equal to or less than 1. Optionally, a is greater than 0.5 and equal to or less than 1. Optionally, a is greater than or equal to 0.2, 0.25, 0.3, 0.35, 0.4, 0.45, 0.5, 0.55, 0.6, 0.65, 0.7, 0.75, 0.8, 0.85, 0.9, or 0.95. Optionally, a is equal to or greater than 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, or 0.4. According to several aspects such materials are pre-lithiated and used as a cathode in an electrochemical cell. A cathode 110 further optionally includes one or more lithium metal oxide active materials with the general formula $Li_{1+a}M_xO_y$, wherein M is optionally a transition metal or other element, optionally Ni, Co, Al, V, Ti, B, Zr, Mn, Mg, or any combination thereof, optionally excluding Mn, and a, x and y are selected such that the formula is satisfied, optionally where y is 4 and x is 2. Optionally, y is less than or equal to 6. In some aspects, a is greater than zero and equal to or less than 1. Optionally, a is greater than 0.02 and equal to or less than 1.

In some aspects, extra Li can be reversibly inserted by pre-lithiation into Ni-, Co-, or Mn-containing $LiMO_2$-type materials that satisfy the general formula where the materials have a α-$NaFeO_2$ layered structure by an electrochemical process. Equation 1 gives an example of an exemplary electrochemical process for pre-lithiating the active material represented by an overall formula $Li_pMO_2$:

$$Li_pMO_2 + aLi^+ + ae^- \leftrightarrow Li_{p+a}MO_2 \quad (1)$$

where p is any lithium within the active material prior to the pre-lithiation process.

For typical p of about 1, the equation 1 redox process takes place at an electrochemical potential of ~1.2 to 2V vs. Li, a much lower potential than the ~3.5 to 4V vs. Li associated with the normal cathode cycling process shown in equation 2:

$$Li_pMO_2 \leftrightarrow Li_{p-x}MO_2 + xLi^+ + xe^- \quad (2).$$

It is believed that the lower potential of process described by equation 1 is associated with a $M^{2+/3+}$ redox transition as opposed to the $M^{3+/4+}$ transition of the process described by equation 2. However, the ~2V potential of the process described by equation 1 is still well above the electrolyte reduction potential associated with solid-electrolyte interface (SEI) formation, enabling much more flexibility in selection of electrolytes. The higher potential of pre-lithiated cathode compared to that of a pre-lithiated anode also makes it less susceptible to degrading under ambient atmospheric conditions. In addition, the higher potential of cathode pre-lithiation will allow for much higher electrochemical pre-lithiation rates without the risk of Li plating, which limits the rate and thus manufacturing throughput at which anodes can be pre-lithiated. In addition, pre-lithiation produces only small volume changes, less than 15% for example, optionally 12% or less, in cathode active material, making it much less difficult to handle the pre-lithiated cathode electrode than pre-lithiated Li alloy-based anodes. Electrochemically pre-lithiated cathodes are, therefore, superior for pre-lithiating Li-ion cells having anodes based on Si and other low $1^{st}$ cycle coulombic efficiency active materials. Such cathodes function to maximize Li-ion cell energy density.

In some aspects, extra Li can be reversibly inserted by pre-lithiation into Mn-containing $LiM_2O_4$-type materials that satisfy the general formula where the materials have a spinel structure by an electrochemical process. Equation 3 gives an example of the electrochemical process:

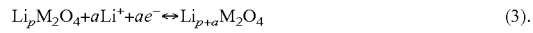

$$Li_pM_2O_4 + aLi^+ + ae^- \leftrightarrow Li_{p+a}M_2O_4 \quad (3).$$

Optionally, M in pre-lithiated $LiM_2O_4$-type materials may include Ni and other metals as well as Mn. In some aspects, a is greater than zero and equal to or less than 1.0, and p is a value obtainable by synthetic procedures. Optionally, a is greater than 0.02 and equal to or less than 1. Optionally, a is greater than 0.3 and equal to or less than 1. Optionally, a is greater than 0.4 and equal to or less than 1. Optionally, a is greater than 0.5 and equal to or less than 1. Optionally, a is greater than or equal to 0.2, 0.25, 0.3, 0.35, 0.4, 0.45, 0.5, 0.55, 0.6, 0.65, 0.7, 0.75, 0.8, 0.85, 0.9, or 0.95. Optionally, a is equal to or greater than 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, or 0.4.

Pre-lithiating an electrode active material reduces its thermodynamic potential as compared to the non-pre-lithiated material. A pre-lithiated electrode or electrode active material may have a thermodynamic potential (i.e., potential measured versus a Li/Li+ counter electrode) less than 3.3V. Optionally, a pre-lithiated electrode or electrode active material may have a thermodynamic potential less than 3.0V. Optionally, a pre-lithiated electrode or electrode active material may have a thermodynamic potential less than 2.5V. Optionally, a pre-lithiated electrode or electrode active material may have a thermodynamic potential less than 2.3V. Optionally, a pre-lithiated electrode or electrode active material may have a thermodynamic potential less than 2.0V.

A pre-lithiated electrode or electrode active material may be formed by chemically or electrochemically inserting lithium into the electrode active material. In some aspects, the electrode active material is pre-lithiated by electrochemically depositing lithium into the cathode active material by placing a cathode active material (optionally as a component of an electrode) optionally in a lithium containing electrolyte with a lithium desorbing counter electrode, and applying an electric potential or current. It is appreciated that many different counter electrodes might serve as Li sources in order to electrochemically pre-lithiate a cathode active material according to the process of equation 1. The counter electrode source of lithium is optionally lithium metal, or can be another Li containing material. For example, in aspects where $LiMO_2$ represents the cathode active material, an electrochemical pre-lithiation may be achieved by the following formula 4:

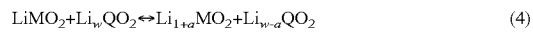

$$LiMO_2 + Li_wQO_2 \leftrightarrow Li_{1+a}MO_2 + Li_{w-a}QO_2 \quad (4)$$

where M and Q are optionally Ni, Co, Al, V, Ti, B, Zr, Mn, or any combination thereof. In some aspects, $LiMO_2$ or $LiQO_2$ can be selected from the group of materials described by the chemical formula $Li_{1+a}Ni_xCo_yMn_zO_2$, where $0<a\leq1$, $0\leq x\leq1$, $0\leq y\leq1$, $0\leq z\leq1$, and $w>a$, wherein at least one of x, y, or z is non-zero. In some aspects, a is greater than zero and equal to or less than 1. Optionally, a is greater than 0.02 and equal to or less than 1. Optionally, a is greater than 0.3 and equal to or less than 1. Optionally, a is greater than 0.4 and equal to or less than 1. Optionally, a is greater than 0.5 and equal to or less than 1. Optionally, a is greater than or equal to 0.2, 0.25, 0.3, 0.35, 0.4, 0.45, 0.5, 0.55, 0.6, 0.65, 0.7, 0.75, 0.8, 0.85, 0.9, or 0.95. Optionally, a is equal to or greater than 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, or 0.4.

Many different counter electrodes might serve as Li sources in order to electrochemically pre-lithiate a cathode active material according to the process of equation 3. The counter electrode source of lithium is optionally lithium metal, or can be another Li containing material. For example, in aspects where $LiM_2O_4$ represents the cathode active material, an electrochemical pre-lithiation may be achieved by the following formula 5:

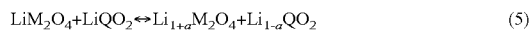
(5)

where M and Q are optionally Ni, Co, Al, V, Ti, B, Zr, Mn, or any combination thereof.

In some aspects, $LiMO_2$ or $LiQO_2$ is selected from the group of doped materials described by the chemical formula $Li_{1+a}Ni_xCo_yMn_zA_wO_2$, where $0<a\leq 1$, $0\leq x\leq 1$, $0\leq y\leq 1$, $0\leq z\leq 1$, and $0\leq w\leq 0.15$, wherein at least one of x, y, or z is non-zero. Optionally, dopant A can be selected from any suitable element. Optionally A is Sc, Ti, V, Cr, Fe, Cu, Zn, Al, Ga, Ge, As, or any combination thereof.

In some aspects, $LiMO_2$ or $LiQO_2$ can be selected from the group of doped materials, with dopant A in the metal site and dopant D in the Li site of the $LiMO_2$ structure described by the chemical formula $Li_{1+a}D_vNi_xCo_yMn_zA_wO_2$, where $0<a\leq 1$, $0\leq x\leq 1$, $0\leq y\leq 1$, $0\leq z\leq 1$, $0\leq w\leq 0.15$, and $0\leq v\leq 0.10$, where at least one of x, y, or z is non-zero. Optionally, dopant A is Sc, Ti, V, Cr, Fe, Cu, Zn, Al, Ga, Ge, As, B, Mg or any combination thereof. Optionally, dopant D is Be, Na, Mg, K, Ca, Sr, Ni, Co, Mn, Sc, Ti, V, Cr, Fe, Cu, Zn, Al, Ga, Ge, B, As, or any combination thereof.

In some aspects, the $LiMO_2$ or $LiQO_2$ of equation 4 may have a gradient in Co and/or Mn.

The active material in the counter electrode used in some aspects is optionally selected from the group consisting of spinels (e.g., $LiMn_2O_4$ or $LiNi_{0.5}Mn_{1.5}O_4$) or olivines (e.g., $LiMPO_4$, where M=Fe, Mn, Co, or Ni or a combination thereof) or silicates (e.g., $Li_2MSiO_4$, where M=Fe, Mn, Co or a combination thereof) or $Li_2MnO_3$.

Figure 2:
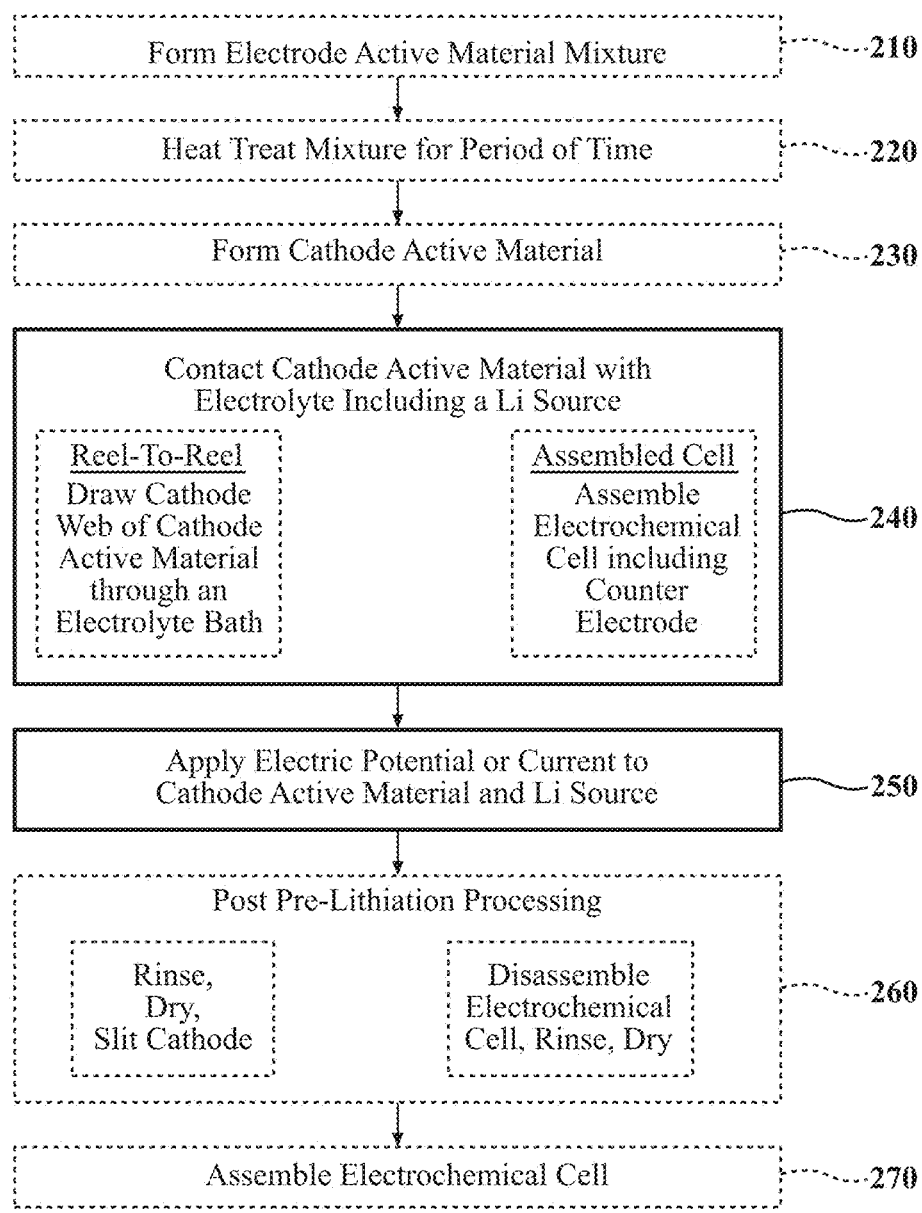
FIG. 2 is a process flowchart of an example pre-lithiation of electrode material according to one or more aspects described herein.

Referring to FIG. 2, a process flowchart of an example method of making and assembling an electrochemical cell using pre-lithiated cathodes is depicted. More specifically, methods of pre-lithiating cathode active material that have not previously been exposed to a charge reaction are depicted. Electrode active materials may be synthesized by methods commonly known in the art. Optionally, in step 210, electrode active material may be prepared by contacting a lithium compound with one or more metal compounds, optionally a cobalt containing compound and a nickel containing compound, alone or in combination with an Mn containing compound or one or more dopant compounds to form a mixture. The mixture, in step 220, is then heated to about 30° C. to about 200° C. for about 0.1 to 5 hours; subsequently, the mixture is heated to about 200° C. to about 500° C. for about 0.1 to about 5 hours; subsequently the mixture is heat treated to 600° C. to about 1000° C. for about 1 to about 24 hours to manufacture the active material. The metal containing precursor compounds may be metal oxides, metal hydroxides, metal nitrides, metal carbonates, metal sulfates, or any other suitable metal containing precursor compound as is recognized by one of ordinary skill in the art.

More specifically, to form the mixture in step 210, the lithium compound, the metal compounds, and the dopant compound(s) may be contacted in a liquid, and the liquid evaporated to form a mixture. The liquid may include water, an alcohol such as ethanol, propanol, isopropanol, butanol, or isobutanol, an acetate such as methyl acetate, ethyl acetate, or butyl acetate, acetonitrile, a ketone such as acetone, a glycol such as ethylene glycol, hexylene glycol, diethylene glycol, or ethylene glycol monoethyl ether, xylene, or a halogenated hydrocarbon such as methylene dichloride, chloroform, carbon tetrachloride, or ethylene dichloride, or a combination thereof. Water is specifically mentioned. The mixture, in step 220 may then be heat treated at about 30° C. to about 200° C., specifically about 40° C. to about 180° C., more specifically about 50° C. to about 160° C. to form a dried mixture. The dried mixture may be heated at about 5° C. to about 20° C. per minute to about 200° C. to about 500° C., specifically about 250° C. to about 450° C., and heat treated at about 200° C. to about 500° C., specifically about 250° C. to about 450° C., for about 0.1 to about 5 hours, specifically about 1 to about 4 hours. The material may then be heated at about 5° C. to about 100° C. per minute to about 600° C. to about 1000° C., specifically about 650° C. to about 850° C. for about 0.1 to about 24 hours, specifically about 1 to about 9 hours, to manufacture the active material.

Once the electrode active material is formed through step 220 the electrode active material is optionally used in a cathode of an electrochemical cell. Optionally, in step 230, a cathode active material is formed from the electrode active material from step 220. A cathode may include the active material as disclosed above, and may further include a conductive agent and a binder. The conductive agent may comprise any conductive agent that provides suitable properties and may be amorphous, crystalline, or a combination thereof. The conductive agent may comprise a carbon black, such as acetylene black or lamp black, a mesocarbon, graphite, carbon fiber, carbon nanotubes such as single wall carbon nanotubes or multi-wall carbon nanotubes, or a combination thereof. The binder may comprise any binder that provides suitable properties and may comprise polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polyacrylic acid, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof, for example.

The cathode may be manufactured, in step 230, by combining the active material, the conductive agent, and the binder in a suitable ratio, e.g., about 80 to about 99 weight percent of the active material, about 0.5 to about 20 weight percent of the conductive agent, and about 0.5 to about 10 weight percent of the binder, based on a total weight of the active material, the conductive agent, and the binder. The active material, the conductive agent, and the binder may be suspended in a suitable solvent, such as N-methylpyrrolidinone, and deposited on a suitable substrate, such as aluminum foil, and dried in air at elevated temperature, for example 130° C., to form a finished cathode electrode.

Once the cathode active material is formed in step 230 and applied to a substrate to form a cathode electrode, the cathode active material may be pre-lithiated through steps 240 and 250. Generally, pre-lithiation of a cathode active material may be accomplished by contacting the cathode active material with electrolyte including a Li source in step 240. Concurrent with step 240, an electric potential or current is applied to the cathode active material and Li source in step 250. Steps 240 and 250 include at least two non-limiting examples of accomplishing the pre-lithiation.

An optional method of pre-lithiating cathode active material by steps 240 and 250 includes electrochemical pre-lithiation of finished cathodes by a reel-to-reel process that draws a cathode web of cathode active material through a Li salt electrolyte bath containing a Li metal or other Li-containing counter electrode. The extent of pre-lithiation can be controlled by adjusting the current density and the speed of the cathode web's passage through the bath. For example, pre-lithiation to the extent of 0.28 mAh/cm$^2$ would be accomplished by drawing a cathode web through a 10 meter long path in the electrolyte bath at a speed of 6 m/min with a pre-lithiation current density of 10 mA/cm$^2$ applied to the cathode. Optionally, the pre-lithiation current density is 1 mA/cm$^2$ to 20 mA/cm$^2$, or any value or range therebetween. A range of different current or voltage modulation protocols can be applied for electrochemical pre-lithiation. The current and voltage modulation protocols may be a current protocol of 0.1 C, where C is the normal (not pre-lithiated) capacity of the cathode in mAh/cm$^2$, and IC is the current density corresponding to that capacity being passed in 1 hour, optionally a current protocol ranging from 0.01 C to 10 C mA/cm$^2$ current density applied to the cathode. The cathode can then be rinsed and dried, further processed if necessary (e.g., slit), and assembled into cells.

The electrolyte used for the pre-lithiation may include solvent and salt such as a lithium salt. The solvent may include an organic solvent and a lithium salt. The organic solvent may be a linear or cyclic carbonate. Illustrative organic solvents include ethylene carbonate, propylene carbonate, butylene carbonate, trifluoropropylene carbonate, γ-butyrolactone, sulfolane, 1,2-dimethoxyethane, 1,2-diethoxyethane, tetrahydrofuran, 3-methyl-1,3-dioxolane, methyl acetate, ethyl acetate, methylpropionate, ethylpropionate, dimethyl carbonate, diethyl carbonate, ethyl methyl carbonate, dipropyl carbonate, methylpropyl carbonate, fluorinated ethylene carbonate, vinylene carbonate or a combination thereof. In some aspects, the electrolyte is a polymer electrolyte.

A lithium salt in some illustrative examples may be $LiPF_6$, $LiBF_4$, $LiAsF_6$, $LiClO_4$, $LiCF_3SO_3$, $LiN(CF_3SO_2)_2$, $LiN(SO_2C_2F_5)_2$, $LiSbF_6$, $LiC(CF_3SO_2)_3$, $LiC_4F_9SO_3$, $LiAlCl_4$, LiBr, and LiI. The lithium salt may be dissolved in the organic solvent. A combination including at least one of the foregoing solvents and salts can be used. The concentration of the lithium salt can be 0.1 to 2.0 M in the electrolyte.

In some aspects, electrochemical pre-lithiation of finished cathodes can be performed by a simple electrochemical deposition process that immerses the cathode web in a Li salt electrolyte bath containing a Li metal counter electrode. The extent of pre-lithiation can be controlled by adjusting the current density and the speed of the web's passage through the bath. The pre-lithiated cathode of step 250 can then be rinsed and dried in step 260, further processed if necessary (e.g., slit), and assembled into cells in step 270.

In some aspects, the finished active material electrodes can be cut to certain sizes and then be electrochemically pre-lithiated in the electrochemical bath prior to assembly into the electrochemical cell.

Another optional method of pre-lithiating the cathode active material in steps 240 and 250 includes assembling a cathode with the cathode active material in an electrochemical cell including a counter electrode. In some aspects, the cathodes may be cut to a certain size and pre-lithiated using a Li-containing active material electrode as the counter electrode. In such aspects, the cut cathodes and lithium containing counter electrodes are assembled in an electrochemical cell for the purpose of electrochemical pre-lithiation of the cathodes with the lithium containing counter electrode. Once the electrochemical cell is assembled in step 240, an electric potential or current is applied to the electrochemical cell in step 250 thereby pre-lithiating the cathode within the electrochemical cell. Following electrochemical pre-lithiation, the electrochemical cell is disassembled in step 260 and the pre-lithiated cathode active material electrodes are rinsed in a solvent to remove salt and dried. Following the drying, the electrochemically pre-lithiated electrodes are ready for assembly into a final electrochemical cell in step 270.

The pre-lithiated cathode active material has a first charge capacity of greater than a control identical non-pre-lithiated cathode active material. Optionally, the first charge capacity of the pre-lithiated cathode is 10 mAh/g of active material or greater than the control. Optionally, the first charge capacity of the pre-lithiated cathode is 20 mAh/g of active material or greater than the control. Optionally, the first charge capacity of the pre-lithiated cathode is 40 mAh/g of active material or greater than the control. Optionally, the first charge capacity of the pre-lithiated cathode is 60 mAh/g of active material or greater than the control.

Referring again to FIG. 1, also provided are electrochemical cells 100, optionally lithium-ion electrochemical cells, that include the pre-lithiated cathode 110, a suitable anode 130, and a lithium-ion conducting electrolyte. The electrochemical cell 100 may be a lithium-ion battery, a lithium-polymer battery, or a lithium battery, for example. The electrochemical cell 100 may include a pre-lithiated cathode 110, an anode 130, and a separator 120 interposed between the pre-lithiated cathode 110 and the anode 130.

The separator 120 may be a microporous membrane, and may be a woven or non-woven or perforated or expanded porous film comprising polypropylene, polyethylene, polyimide, polyester or other polymer or combinations thereof.

The pre-lithiated cathode 110 can be paired with many different anodes 130 optionally including graphite, Si-based alloys, $SiO_x$, Al, Sn, Ge, or any combination thereof. Li-alloy forming anodes can be used on their own with conductive carbon and binder or blended with graphite. The anode 130 may comprise a coating on a current collector. The coating may comprise a suitable carbon, such as graphite, coke, a hard carbon, or a mesocarbon such as a mesocarbon microbead, for example. The current collector may be copper foil, for example. The conductive agent may comprise a carbon black, such as acetylene black or lamp black, a mesocarbon, graphite, carbon fiber, carbon nanotubes such as single wall carbon nanotubes or multi-wall carbon nanotubes, or a combination thereof. The binder may include any binder that provides suitable properties and may include polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polyacrylic acid, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, carboxy methyl cellulose/styrene-butadiene rubber, or a combination thereof, for example.

The electrochemical cell 100 also includes an electrolyte, which contacts the pre-lithiated cathode 110, the anode 130, and the separator 120. The electrolyte may include an organic solvent and a lithium salt. The organic solvent may be a linear or cyclic carbonate. Representative organic solvents include ethylene carbonate, propylene carbonate, butylene carbonate, trifluoropropylene carbonate, γ-butyrolactone, sulfolane, 1,2-dimethoxyethane, 1,2-diethoxyethane, tetrahydrofuran, 3-methyl-1,3-dioxolane, methyl acetate, ethyl acetate, methylpropionate, ethylpropionate, dimethyl carbonate, diethyl carbonate, ethyl methyl carbonate, dipropyl carbonate, methylpropyl carbonate, fluorinated ethylene carbonate, vinylene carbonate or a combination thereof. In another aspect, the electrolyte is a polymer electrolyte.

Representative lithium salts used in an electrolyte of an electrochemical cell 100 include cut are not limited to $LiPF_6$, $LiBF_4$, $LiAsF_6$, $LiClO_4$, $LiCF_3SO_3$, $LiN(CF_3SO_2)_2$, $LiN(SO_2C_2F_5)_2$, $LiSbF_6$, $LiC(CF_3SO_2)_3$, $LiC_4F_9SO_3$, and $LiAlCl_4$. The lithium salt may be dissolved in the organic solvent. A combination comprising at least one of the foregoing can be used. The concentration of the lithium salt can be 0.1 to 2.0M in the electrolyte.

The electrochemical cell 100 may have any suitable configuration or shape, and may be cylindrical or prismatic.

Various aspects are illustrated by the following non-limiting examples. The examples are for illustrative purposes and are not a limitation on any practice of the present invention. It will be understood that variations and modifications can be made without departing from the spirit and scope of the invention.

Comparative Example 1

A lithium-ion cell was prepared with a fresh $LiNiO_2$-based cathode electrode (non-pre-lithiated) opposite a lithium-metal anode. The $LiNiO_2$-based cathode material is synthesized at CAMX Power, Lexington, Mass. The synthesis of this material is as follows. A material having the composition $Li_{1.05}Mg_{0.025}Ni_{0.92}Co_{0.08}O_{2.05}$ was prepared by first dry mixing Li(OH) (anhydrous fine powder made by dehydrating $LiOH.H_2O$ available from FMC Corporation, Philadelphia, Pa.) with $Mg(OH)_2$ (fine powder available from Alfa Aesar, Ward Hill, Mass.). To the mixture of Li(OH) and $Mg(OH)_2$ was added $Ni_{0.92}Co_{0.08}(OH)_2$ (available from Toda America, Battle Creek, Mich.) in a ceramic jar. The compounds were mixed by shaking the jar with ceramic media. The mixed compounds were placed in an alumina crucible and sintered at about 700° C. The sample was then allowed to cool naturally to room temperature. The cooled sample was ground for about five minutes to break up any agglomerates. The ground sample was subsequently coated with Co and Al and additional lithium salt and subjected to a heat treatment with a maximum temperature of about 700° C. The sample was then allowed to cool naturally to room temperature to provide the $LiNiO_2$-based material having the overall composition $Li_{1.01}Mg_{0.024}Ni_{0.88}Co_{0.12}Al_{0.003}O_{2.03}$ The cathode active material was blended with PVdF (Kureha KF-1120) and carbon (Denka black) at 94:3:3 ratio in N-methylpyrrolidinone to form a slurry, and the slurry coated on an aluminum foil current collector to give active material loading of ~10 mg/cm². Cathodes were punched from the coated aluminum foil and were assembled into half-cells with lithium foil, a polymeric separator (Celgard 2325) and an electrolyte of 1 M $LiPF_6$ in 1/1/1 (vol.) EC/DMC/EMC with 1 wt. % VC (Kishida Chemical) in a 2025 coin cell.

Figure 3:
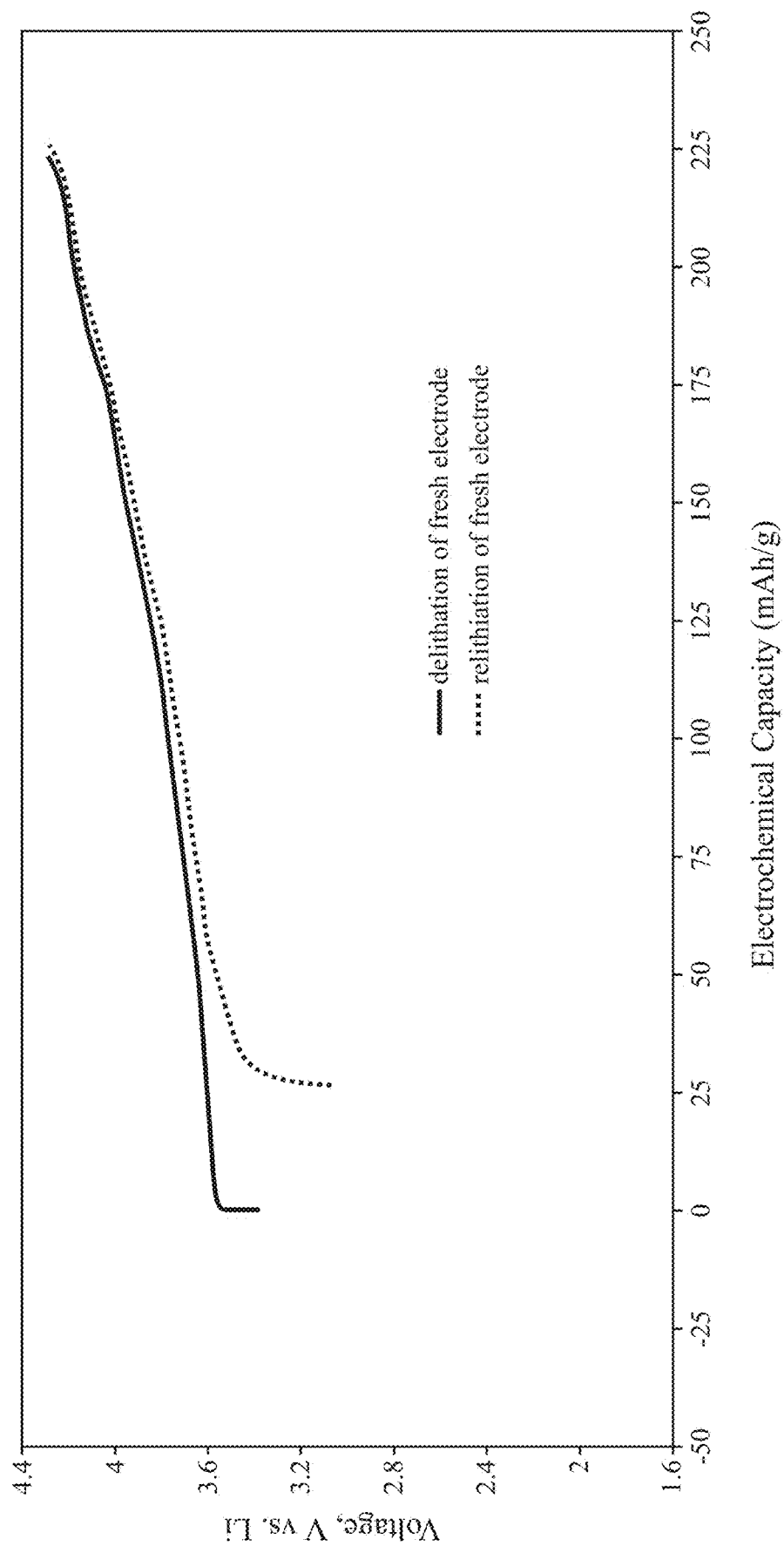
FIG. 3 is a graph depicting performance characteristics of an example electrochemical cell that was not pre-lithiated according to one or more aspects described herein.

Referring to FIG. 3, the normal first charge (delithiation) and first discharge (relithiation) curves for $LiNiO_2$-based cathode material (described in Comparative Example 1) opposite a lithium metal anode of the comparative example 1 is shown. The electrolyte was 1M $LiPF_6$ in 1/1/1 ethylene carbonate/dimethyl carbonate/ethyl methyl carbonate. Coin cells were electrochemically charged and discharged on a Maccor 4000 battery cycler using a C/20 charge to 4.3V with a constant voltage at 4.3V until current decayed to C/50 followed by a C/20 discharge to 3V. Nominal C-rate of 200 mA/g was used to specify current. The charge (delithiation of fresh electrode)/discharge (relithiation of fresh electrode) voltage profiles for this electrode are shown in FIG. 3. The charge capacity (i.e. delithiation) for this cathode was measured at 227 mAh/g and the discharge capacity of the cathode was measured at 200 mAh/g.

Example 1

Figure 4:
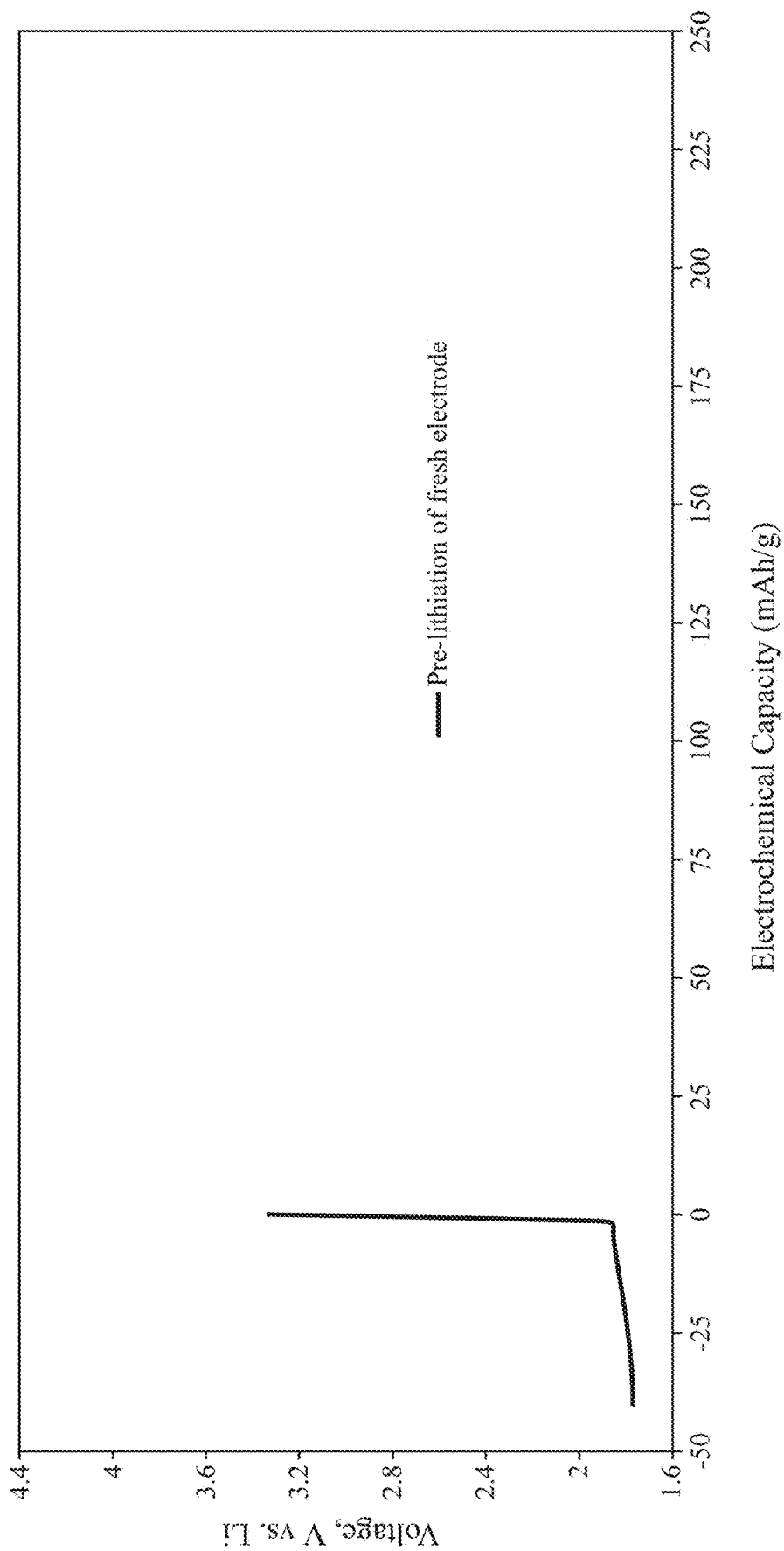
FIG. 4 is a graph depicting pre-lithiation of a cathode according to one or more aspects described herein.

Referring to FIG. 4, a capacity/voltage plot showing electrochemical pre-lithiation of $LiNiO_2$-based cathode is shown. FIG. 4 demonstrates electrochemical pre-lithiation of a cathode that was prepared in the same way as in Comparative Example 1. To pre-lithiate the cathode, an electrochemical cell with a fresh cathode was assembled opposite a lithium metal anode in an electrolyte that was 1M $LiPF_6$ in 1/1/1 ethylene carbonate/dimethyl carbonate/ethyl methyl carbonate. The measured open-circuit potential for this cell was around 3.3 V, which is typical for the $LiNiO_2$-based cathode. This fresh cathode was first pre-lithiated at C/50 rate (cell was discharged) to 40 mAh/g capacity (shown as ~40 mAh/g in FIG. 4). The extent of pre-lithiation can be controlled by the charge passed. Nominal C-rate of 200 mA/g was used to specify current, i.e., nominal 1 C-rate capacity of 200 mAh/g.

Example 2

Figure 5:
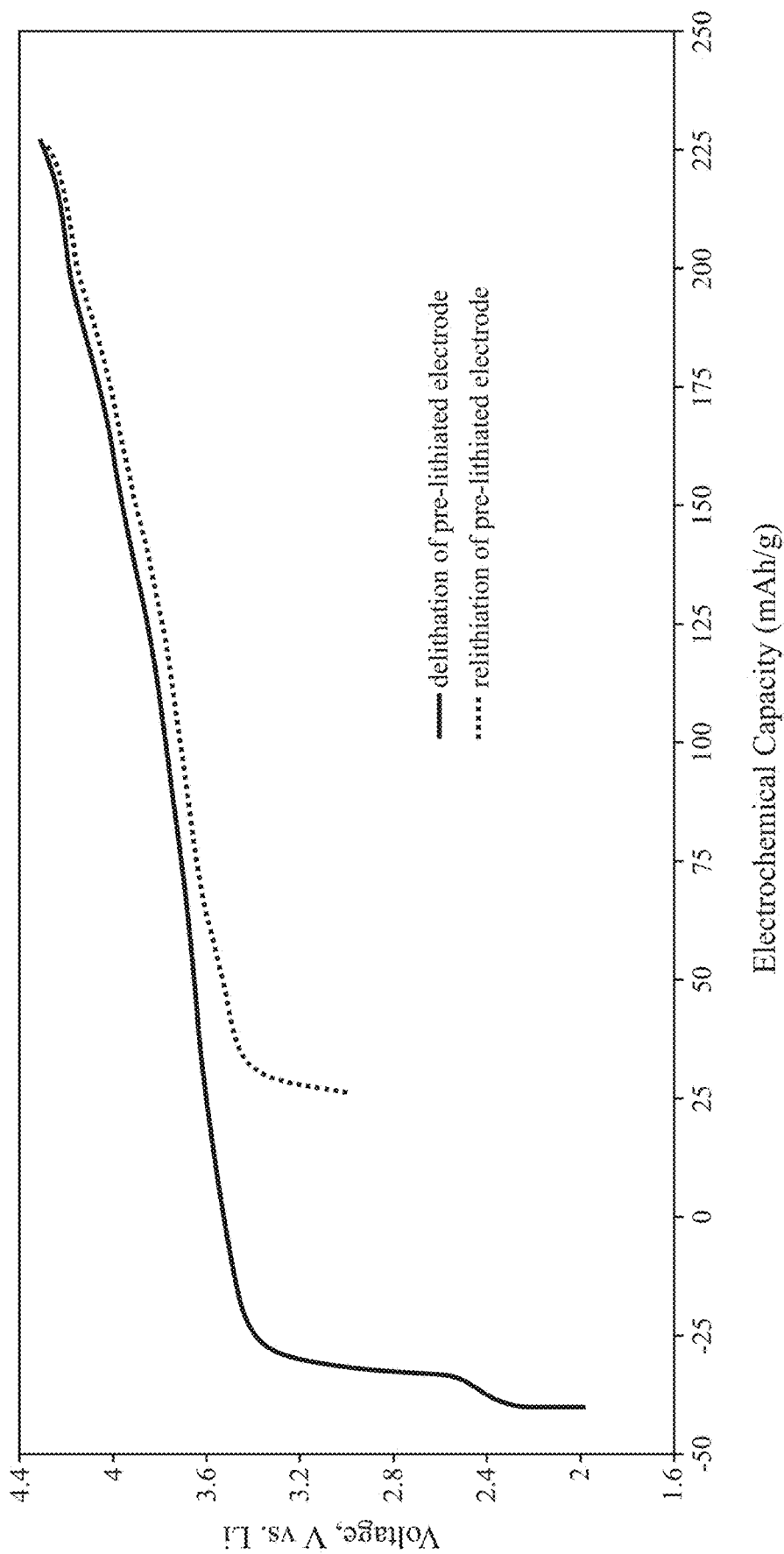
FIG. 5 is a graph depicting delithiation and relithiation of an example pre-lithiated cathode electrode of an electrochemical cell according to one more aspects described herein.

Referring to FIG. 5, the lithium present in the pre-lithiated cathode can be extracted by subsequent charge as illustrated. The graph of FIG. 5 shows a capacity/voltage plot for the delithiation of the electrochemically pre-lithiated $LiNiO_2$-based cathode, and subsequent relithiation. The cell in FIG. 5 was prepared according to Example 1 and the electrolyte was 1M $LiPF_6$ in 1/1/1 ethylene carbonate/dimethyl carbonate/ethyl methyl carbonate. The cell was charged to 4.3V at C/20 rate, held at constant voltage at 4.3V until current decayed to C/50, followed by C/20 discharge where 200 mA/g active was specified as the nominal 1 C-rate.

The cell from Example 1 is charged resulting in a total charge capacity passed of 267 mAh/g (delithiation of pre-lithiated electrode). The subsequent discharge (relithiation of pre-lithiated electrode) shows a discharge capacity of ~200 mAh/g. Comparing the data in FIG. 5 with that in FIG. 3 shows that the cathode charge capacity was higher following the pre-lithiation step of Example 1. Furthermore, the discharge (relithiation of pre-lithiated electrode) of the pre-lithiated cathode was identical to the discharge of the fresh cathode (relithiation of fresh electrode) indicating that no damage was introduced as a consequence of electrochemical pre-lithiation.

Comparing the delithiation results for the cells in FIG. 3 and FIG. 5 shows that both cathodes reach the same 226 mAh/g extent of delithiation, demonstrating that the entire 40 mAh/g pre-lithiation capacity of the pre-lithiated cathode was extracted upon the first delithiation, together with the full quantity of available Li originally present in the fresh as-made cathode. Comparing the relithiation results for the two cells shows that both cathodes reach the same extent of relithiation (delithiated by 25 mAh/g relative to as-made material), demonstrating that they both delivered the same 200 mAh/g of cathode material when the cell was discharged. These results show that the pre-lithiation of the cathode is fully reversible, and that it does not negatively affect the cathode performance.

Example 3

Figure 6A:
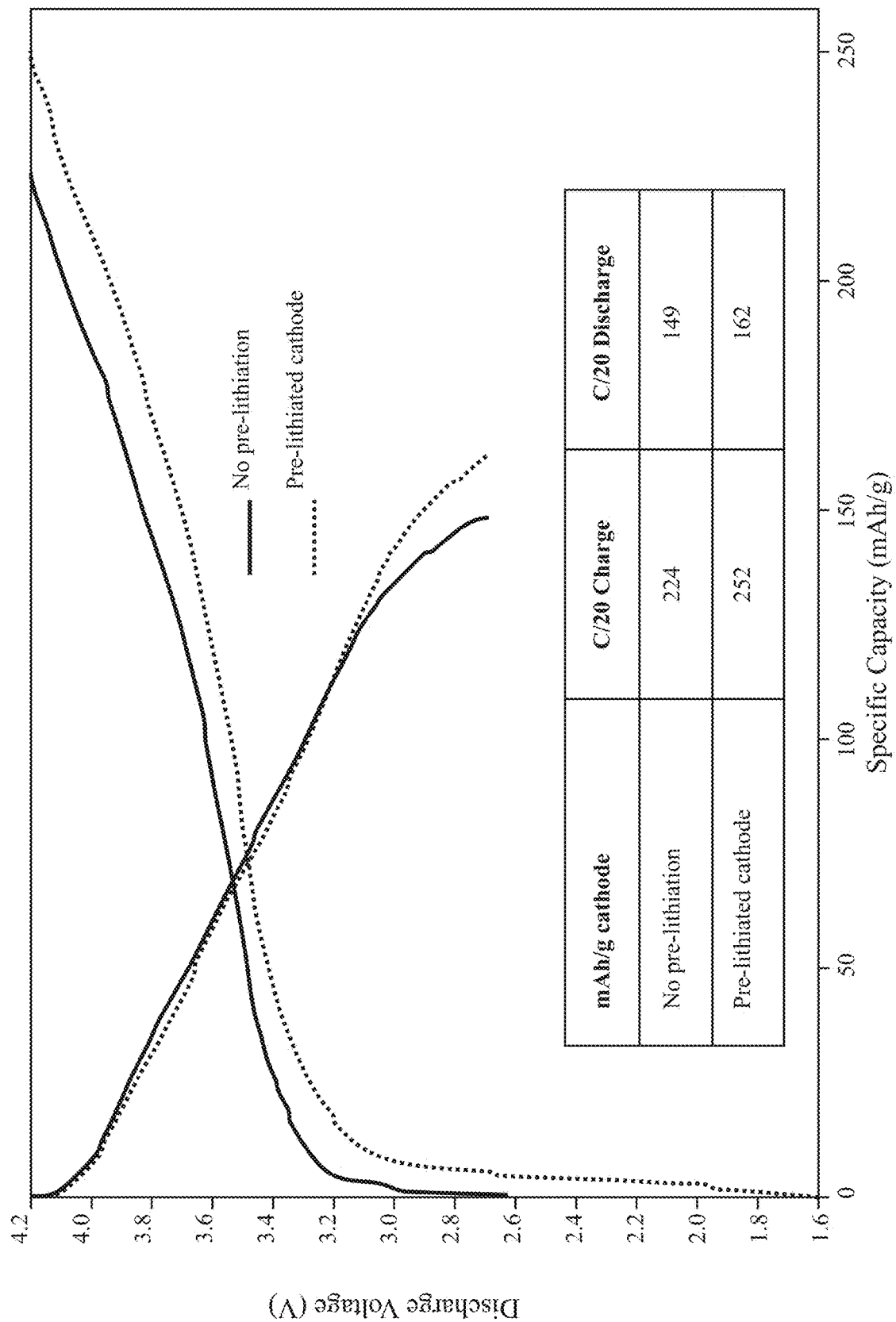
FIGS. 6A and 6B are graphs depicting performance characteristics of an example pre-lithiated and non-pre-lithiated electrochemical cell according to one or more aspects described herein.
Figure 6B:
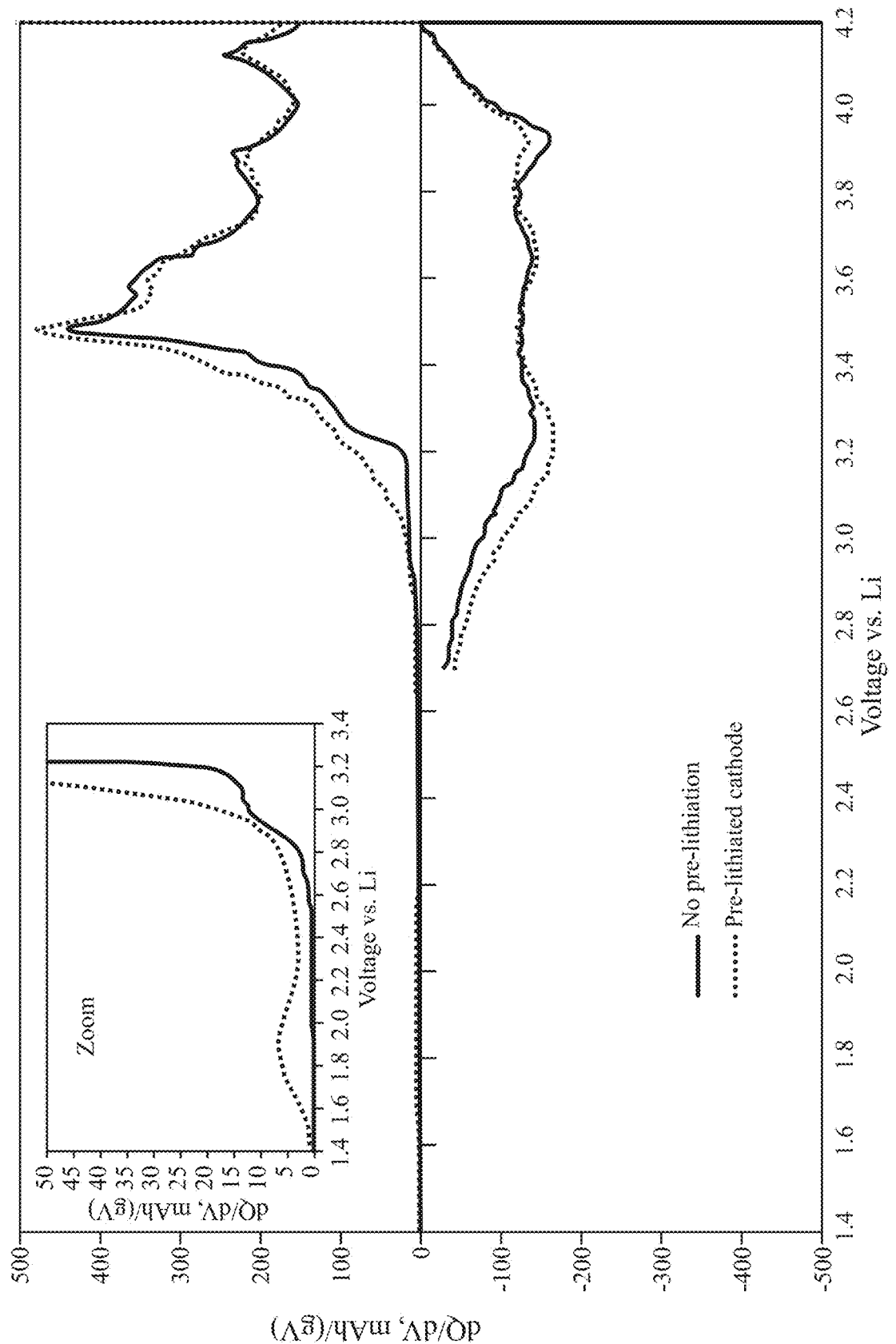

Referring to FIGS. 6A and 6B the first charge (C/50) and discharge (C/20) formation cycle voltage vs. capacity plot and corresponding differential capacity vs. voltage plot comparing pre-lithiated and non-pre-lithiated $LiNiO_2$-based cathode paired with a 75% active $SiO_x$ anode are shown. Electrochemically pre-lithiated and as-made control cathodes were tested in full cells with a low efficiency $SiO_x$ based anode. Fresh cathode electrodes were prepared using the procedure described in Comparative Example 1 with active material loading of ~18-20 mg/cm$^2$.

Cathode electrodes were electrochemically pre-lithiated in an Argon filled glove box by mechanically stacking a copper grid current collector contacting several coin cell sized cathode electrodes, a polymer separator soaked in electrolyte, and a Li metal foil deposited on a copper grid current collector between two glass plates. 1 M $LiPF_6$ in 1/1/1 (vol.) ethylene carbonate/dimethyl carbonate/ethyl methyl carbonate (EC/DMC/EMC) with 1 wt. % vinylene carbonate (VC) with 10% fluorinated ethylene carbonate (FEC) electrolyte was used to soak the separator. Copper grid current collectors were then connected to the Maccor 4000 battery cycler for electrochemical pre-lithiation. The cathode electrodes were pre-lithiated at constant current with a C/50 rate to 40 mAh/g active where 200 mA/g active was specified as the nominal 1 C-rate. Once pre-lithiation was completed, cathode electrodes were removed from the stack, rinsed with DMC solvent, and dried.

The anode electrode coating was prepared with SiOx active material, acetylene black conductive carbon and polyacrylic acid binder in a 75:10:15 ratio of active material: acetylene black:binder with a NMP solvent and coated onto copper foil. Fresh control cathodes and pre-lithiated cathode electrodes were assembled into 2025 coin cells with the $SiO_x$ anode electrodes, Celgard 2500 separator, and 1M $LiPF_6$ in 1/1/1 EC/DMC/EMC+1% VC+10% FEC electrolyte. The coin cells were then charged to 4.2V at C/50 rate followed by a C/20 discharge to 2.7V where 200 mA/g (cathode active) was specified as the nominal 1 C-rate. FIG. 6A shows voltage profiles for the first charge/discharge cycle.

When the $SiO_x$ anode was tested with Li metal counter electrode, first cycle efficiency of 69% was obtained when delithiating the anode to 1V, and 60% when delithiating to ~0.7V. As a result, when the control $LiNiO_2$-based cathode was paired with the $SiO_x$ anode, only 149 mAh/g cathode (66.5% 1st cycle efficiency) was obtained during the first C/20 discharge as shown in FIG. 6A, vs. >200 mAh/g obtained when cathode is tested in half cells with Li metal counter electrode. In comparison, full cells with a pre-lithiated cathode showed both higher charge and higher discharge capacity as shown in FIG. 6A. The specific capacities are an average of three cells and capacity is normalized to the cathode active material mass. A close inspection of the differential capacity vs. voltage plot in FIG. 6B shows that additional capacity in the cathode introduced by pre-lithiation, as described above, is extracted during the first charge of the full cells.

Example 4

Figure 7:
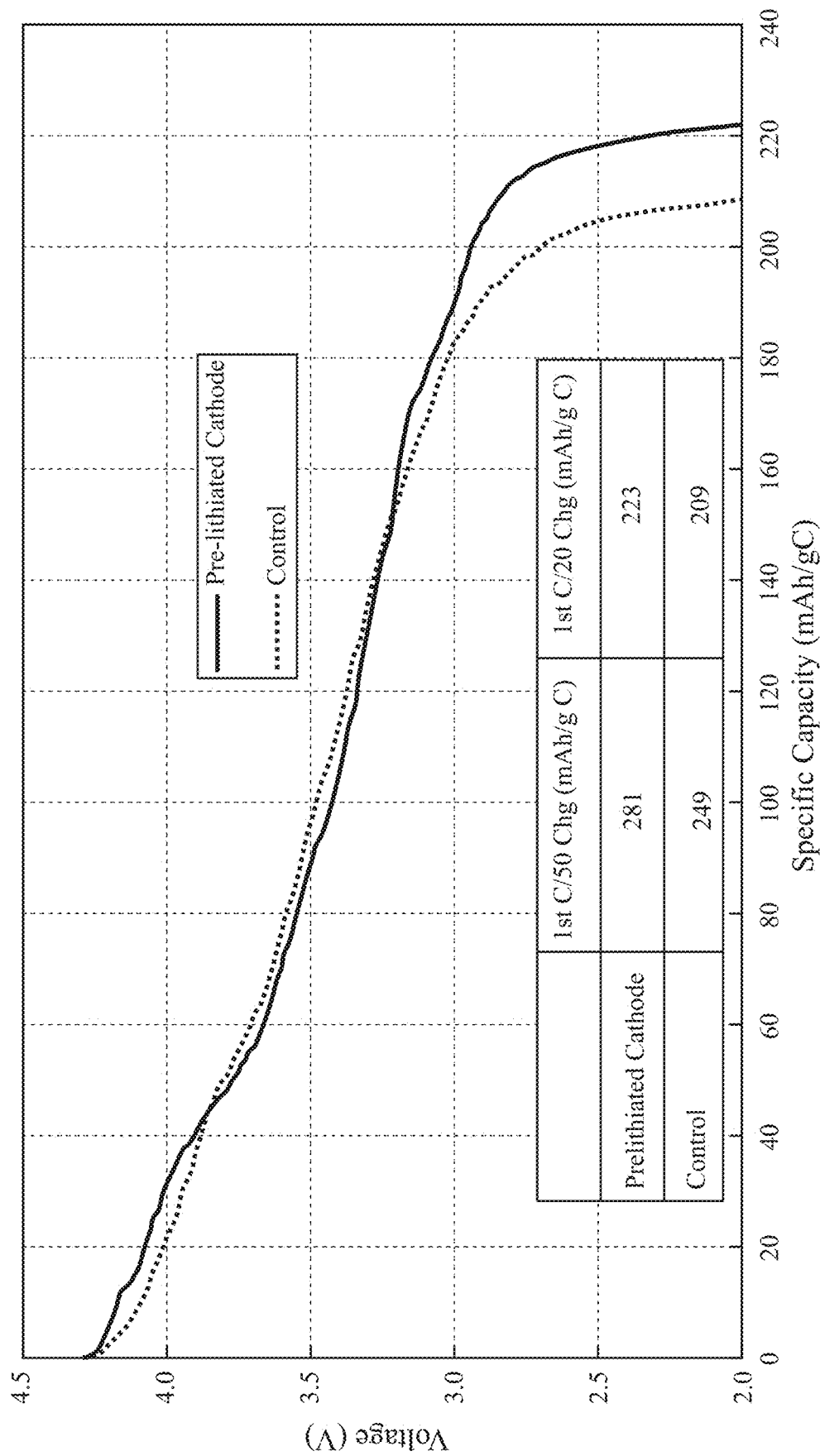
FIG. 7 is a graph depicting performance characteristic of another example pre-lithiated and non-pre-lithiated electrochemical cell according to one or more aspects described herein.

Electrochemically pre-lithiated and as-made control cathodes were also tested in full cells with a nano-Si/C composite anode. Fresh cathode electrodes were prepared using the procedure described in Comparative Example 1 with active material loading of ~15 mg/cm$^2$. Higher capacity active cathode material than the one described in Comparative Example 1 and Examples 1-3 was utilized. Some cathode electrodes were pre-lithiated by ~44 mAh/g using the procedure described in Example 3. The anode electrode coating was prepared with nano-Si/C composite active material, and conductive carbons and polyacrylic acid binder in a 75:10:15 ratio of active material:conductive carbon:binder from a NMP solvent slurry coated onto copper foil. Fresh and pre-lithiated cathode electrodes were assembled into 2025 coin cell with the nano-Si/anode electrodes and 1M $LiPF_6$ in 1/1/1 EC/DMC/EMC+1% VC+10% FEC electrolyte. The coin cells were then charged to 4.3V at C/50 rate followed by a C/20 discharge to 2.0V where 200 mA/g cathode active was specified as the nominal 1 C-rate. FIG. 7 depicts voltage profiles for the first cycle discharge. The specific capacities are an average of three cells and capacity is normalized to the cathode active material mass.

When the nano-Si/C composite anode was tested with Li metal counter electrode, first cycle efficiency of ~83-86% was measured. Still referring to FIG. 7, the measured 1st charge and discharge capacities of 249 and 209 mAh/g (84% 1st cycle efficiency) in the non-pre-lithiated control full cells is consistent with the anode-limited capacity. In comparison, nano-Si/C composite full cells with a pre-lithiated cathode had both higher 1st charge and higher discharge capacity, delivering 223 mAh/g (cathode active) on discharge.

Example 5

To demonstrate scalability, pre-lithiation of the $LiNiO_2$-based cathode was carried out using double sided electrode coatings having composition similar to those used in Example 4. For pre-lithiation, fresh cathode electrodes were assembled with $LiNiO_2$-based Li-source counter electrodes into a multilayer pouch cell with a polymer separator. Pouch cells were filled with a 1M $LiPF_6$ in 1/1/1 EC/DMC/EMC+ 1% VC electrolyte, evacuated, and sealed. Using a Maccor 4000 battery cycler, pouch cells were charged at ~C/50 rate where 200 mA/g was specified as the nominal 1 C-rate, such that 18 mAh/g were transferred from the Li-source ($LiNiO_2$-based electrodes) to the $LiNiO_2$-based electrodes being pre-lithiated. Following pre-lithiation, the pouch cells were disassembled and the pre-lithiated cathode electrodes were rinsed with DMC solvent and dried.

Figure 8:
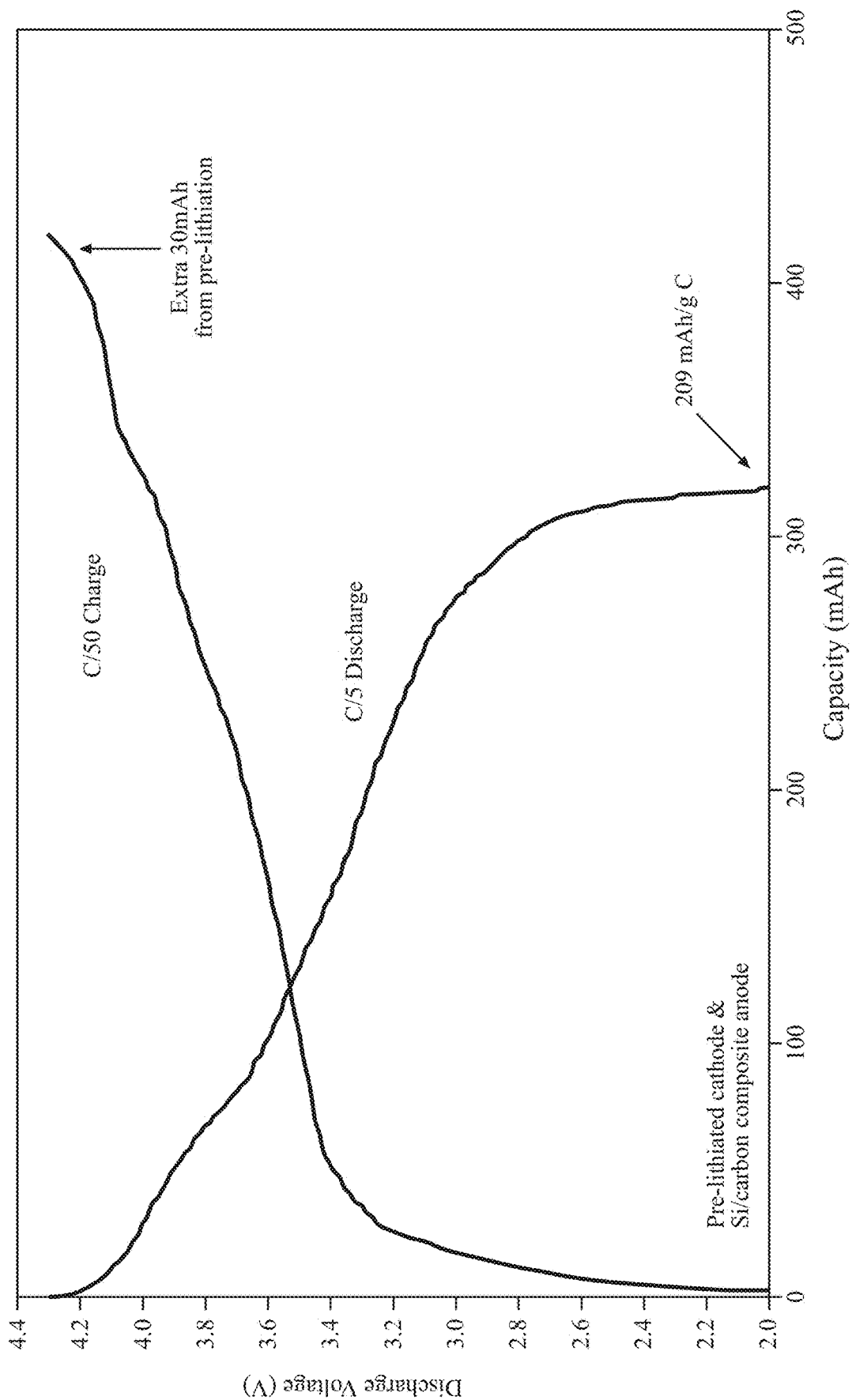
FIG. 8 is a graph depicting performance characteristics of an example 5-layer pouch cell containing a pre-lithiated cathode according to one or more aspects described herein.

The pre-lithiated $LiNiO_2$-based cathodes were then tested in a multi-layer pouch cell with a nano-Si/C composite anode electrode. Double sided and single sided anode electrode coatings with formulation and loadings as those described in Example 4 were used. A 5-layer pouch cell with five double-sided pre-lithiated cathodes, four double-sided anodes, and two single sided anodes was assembled with a polymer separator. The pouch cell was filled with a 1M $LiPF_6$ in 1/1/1 EC/DMC/EMC+1% VC+10% FEC electrolyte, evacuated, and sealed. The pouch cell was electrochemically tested on a Maccor 4000 battery cycler. Referring to FIG. 8, voltage profiles for the first C/50 charge to 4.3V and the first discharge to 2.0V are shown. A capacity of 418 mAh was extracted during charge from the pre-lithiated cathode, with 30 mAh being additional capacity available from pre-lithiated cathode. When discharge capacity is normalized by the cathode active material weight, the pre-lithiated pouch cell delivered 209 mAh/g of cathode active material at C/5 rate.

Example 6

To further demonstrate scalability of pre-lithiation, four commercial cathode active materials including NCA (nominal composition of $LiNi_{0.85}Co_{0.10}Al_{0.05}O_2$, Toda America Inc., NAT-7150), NCM (nominal composition of $LiNi_{0.33}Co_{0.33}Mn_{0.33}O_2$, Umicore, NCM MX-10), LCO (LiCoO$_2$, Pred Materials Inc.), and LMO ($LiMn_2O_4$, Toda America Inc., HPM-6050) were evaluated along with a CAMX Power made cathode with the final composition of $Li_{1.01}Mg_{0.01}Ni_{0.93}Co_{0.06}Al_{0.009}O_2$ made according to the procedure outlined in the Comparative Example 1.

For electrochemical testing, each cathode active material was blended with PVdF (Kureha KF-1120) and carbon (Denka black) at 94:3:3 ratio in N-methylpyrrolidinone to form a slurry, and the slurry coated on an aluminum foil current collector to give active material loading of ~10 mg/cm². Cathodes were punched from the coated aluminum foil and were assembled into half-cells with lithium foil, a polymeric separator (Celgard 2325) and an electrolyte of 1 M $LiPF_6$ in 1/1/1 (vol.) EC/DMC/EMC with 1 wt. % VC (Kishida Chemical) in 2025 coin cell hardware.

For the control experiments, coin cells were electrochemically charged and discharged on a Maccor 4000 battery cycler using a C/20 charge to 4.3V with a constant voltage hold until current decayed to C/50, followed by a C/20 discharge to 3V. Following initial discharge, rate capability was measured with subsequent cycles having a discharge of C/10, C/5, C/2, 1C, 2C, 3C, and 5C discharge to 3V, respectively. After initial slow charge, subsequent charging was done at C/2 rate to 4.3V with a constant voltage hold until current decayed to C/50. Nominal C-rate of 200 mA/g was used to specify current for all materials. All materials were tested in triplicate (3 coin cells).

For pre-lithiation, half-cells with lithium metal were electrochemically discharged at C/50 rate by 20 mAh/g where 200 mA/g was specified as the nominal 1 C-rate. After pre-lithiation, coin cells were electrochemically charged using a C/20 charge to 4.3V with a constant voltage hold until current decayed to C/50, followed by a C/20 discharge to 3V. Following initial discharge, rate capability was measured by subsequent cycles with subsequent cycles having a discharge of C/10, C/5, C/2, 1C, 2C, 3C, and 5C discharge to 3V, respectively, identical to the control.

Referring to Table 1, a comparison of material rate capability for the five commercial cathode active materials with and without 20 mAh/g pre-lithiation is shown. The capacity values are an average of three coin cells for each control and pre-lithiated material evaluated. These data show that for all materials tested, pre-lithiated capacity can be recovered on subsequent charge with first charge capacity being 19-22 mAh/g higher than the control among all materials tested. Moreover, pre-lithiation did not have a substantial impact on discharge capacity at low rate for most materials, with an exception of LCO, which saw an increase in C/20 discharge capacity of 8 mAh/g. LCO also saw the highest impact of pre-lithiation on rate capability with a drop in 5 C capacity of 6 mAh/g.

TABLE 1

| Capacity (mAh/g) | CAMX Material | | NCA | | NCM | | LCO | | LMO | |
|---|---|---|---|---|---|---|---|---|---|---|
| | Cntrl | Pre-lith | Cntrl | Pre-lith | Cntrl | Pre-lith | Cntrl | Pre-lith | Cntrl | Pre-lith |
| Pre-lithiation | — | 20 | — | 20 | — | 20 | — | 20 | — | 20 |
| 1st C/20 Charge | 242 | 263 | 212 | 235 | 176 | 195 | 163 | 182 | 106 | 126 |
| C/20 Discharge | 222 | 224 | 180 | 181 | 157 | 156 | 159 | 167 | 106 | 105 |
| C/10 | 217 | 217 | 175 | 176 | 152 | 148 | 158 | 161 | 107 | 106 |
| C/5 | 211 | 210 | 170 | 171 | 148 | 145 | 158 | 157 | 106 | 105 |
| C/2 | 204 | 203 | 162 | 163 | 142 | 139 | 156 | 154 | 106 | 105 |
| 1 C | 199 | 197 | 156 | 156 | 137 | 134 | 154 | 150 | 105 | 104 |
| 2 C | 193 | 190 | 147 | 146 | 129 | 127 | 150 | 146 | 104 | 104 |
| 3 C | 189 | 186 | 140 | 140 | 124 | 123 | 146 | 142 | 103 | 102 |
| 5 C | 179 | 176 | 124 | 124 | 114 | 113 | 139 | 133 | 101 | 100 |

Figure 9:
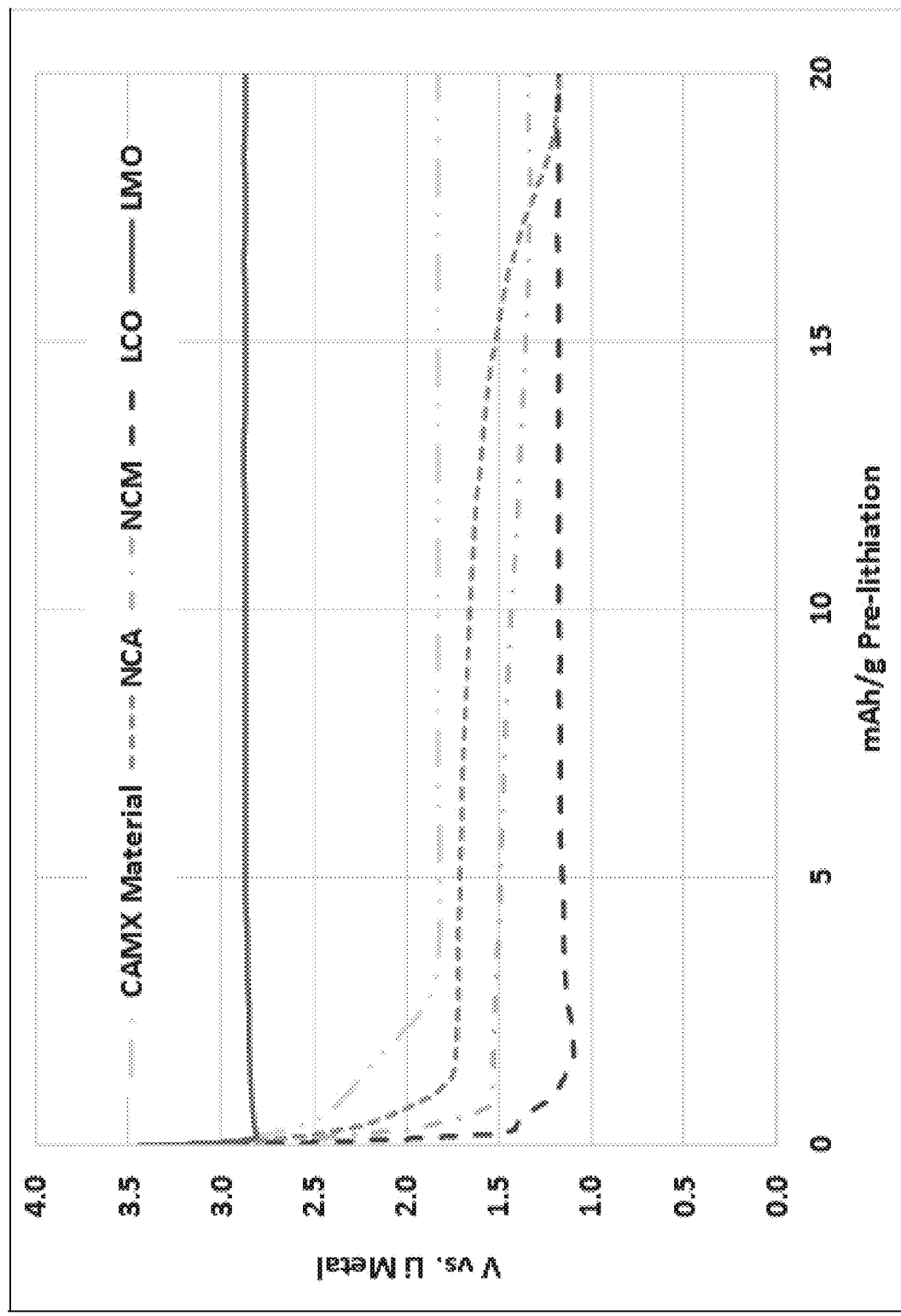
FIG. 9 is a graph depicting performance characteristics of five commercial cathode materials during pre-lithiation according to one or more aspects described herein.

Referring to Table 2, the four commercial cathode active materials and CAMX Power made material were also evaluated for potential before pre-lithiation, potential at the end of pre-lithiation and open circuit voltage (OCV) 20 minutes after pre-lithiation. Each electrode, CAMX material, NCA, NCM, LCO, and LMO, was tested in coin cells opposite Li metal counter electrodes. The electrolyte in each coin cell was 1M LiPF6 in 1/1/1 ethylene carbonate/dimethyl carbonate/ethyl methyl carbonate with 1% vinylene carbonate. Pre-lithiation was carried out at C/50 rate to 20 mAh/g with 200 mA/g specified as the nominal 1 C-rate. Referring also to FIG. 9, a graph of the coin cell voltages for each of the four commercial and CAMX Power cathode active materials as they are pre-lithiated to 20 mAh/g is depicted.

TABLE 2

| Material | OCV Before Pre-lithiation (V vs. Li metal) | End of Pre-lithiation (V vs. Li metal) | OCV after Pre-lithiation (V vs. Li metal) | Extent of Pre-lithiation (mAh/g) |
|---|---|---|---|---|
| CAMX Material | 3.4 | 1.8 | 2.0 | 20 |
| NCA | 3.4 | 1.2 | 1.9 | 20 |
| NCM | 3.4 | 1.3 | 1.4 | 20 |
| LCO | 3.4 | 1.2 | 1.4 | 20 |
| LMO | 3.5 | 2.9 | 2.9 | 20 |

Figure 10:
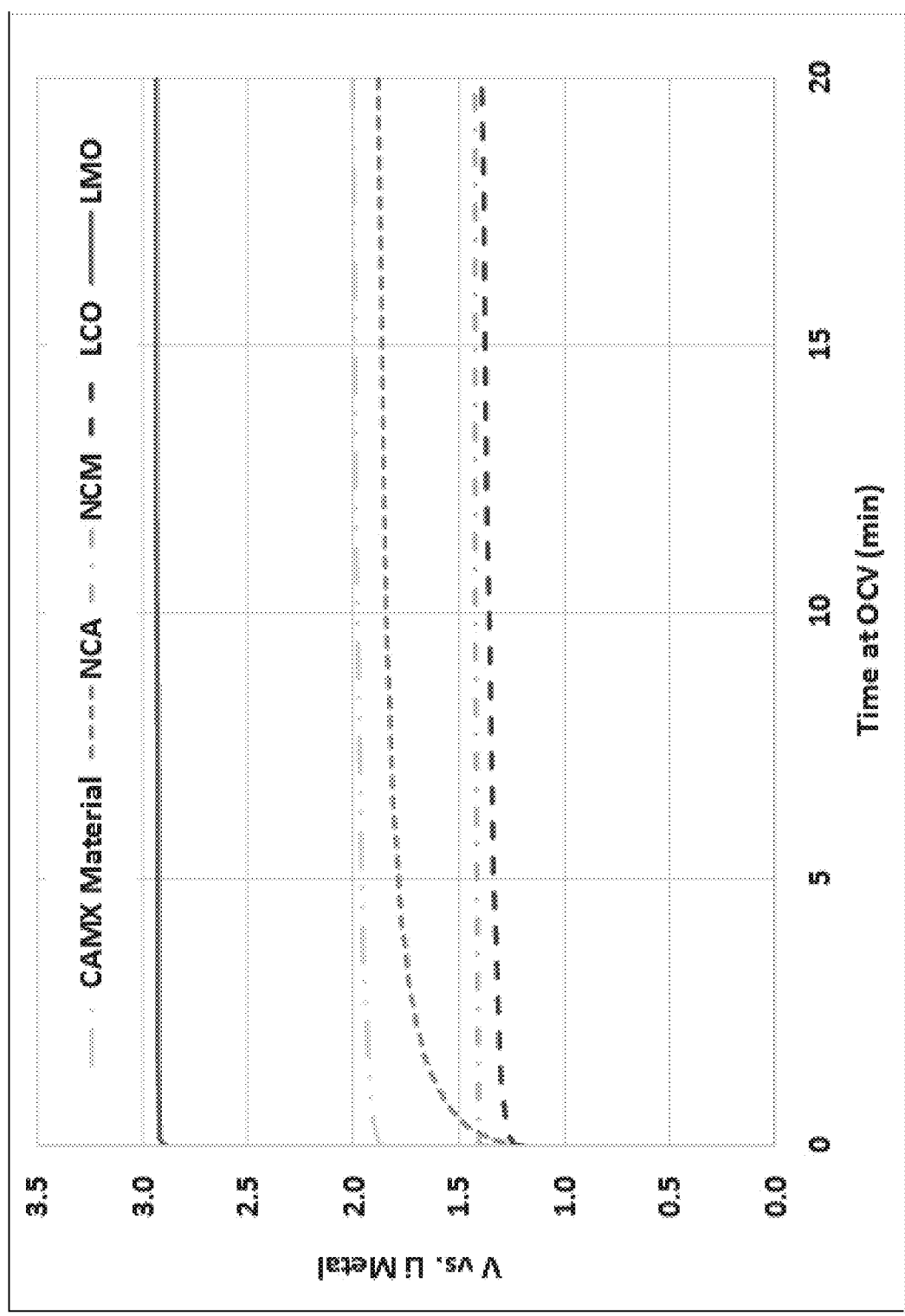
FIG. 10 is a graph depicting open circuit voltage measurements after pre-lithiation of a pre-lithiated cathode according to one or more aspects described herein.

Referring to FIG. 10, a graph of the OCV for each of the materials from Table 2 for the 20 minutes following pre-lithiation is depicted. It can be observed that the OCV of each material after pre-lithiation remains substantially stable about 5-10 minutes after pre-lithiation.

Additionally, the CAMX material was pre-lithiated to three different levels in coin cells opposite Li metal counter electrodes. The electrolyte in each coin cell was 1M LiPF6 in 1/1/1 ethylene carbonate/dimethyl carbonate/ethyl methyl carbonate with 1% vinylene carbonate. Pre-lithiation was carried out at 10 mAh/g, 20 mAh/g and 40 mAh/g. The potential before pre-lithiation, potential at the end of pre-lithiation and open circuit voltage (OCV) 20 minutes after pre-lithiation was monitored for each level of pre-lithiation as shown below. Pre-lithiation was carried out at C/50 rate with 200 mA/g specified as the nominal 1 C-rate. Table 3 reflects the results of the evaluation.

TABLE 3

| Material | OCV Before Pre-lithiation (V vs. Li metal) | End of Pre-lithiation (V vs. Li metal) | OCV after Pre-lithiation (V vs. Li metal) | Extent of Pre-lithiation (mAh/g) |
|---|---|---|---|---|
| CAMX Material | 3.4 | 1.8 | 2.0 | 10 |
|  | 3.4 | 1.8 | 2.0 | 20 |
|  | 3.4 | 1.8 | 2.0 | 40 |

It should now be understood that aspects described herein may be directed to compositions and processes that enable the use of electrode materials traditionally having high irreversible capacity and coulombic inefficiency, thereby limiting cyclable capacity and energy of lithium-ion cells. The described compositions and processes for pre-lithiated cathode materials and electrodes address the issues of irreversible capacity and coulombic inefficiency. Generally, the compositions, system and methods of making and using pre-lithiated cathodes in lithium ion secondary cells described herein supply extra lithium into a lithium ion cell, thereby overcoming limitations of supplying extra lithium through other Li-ion cell pre-lithiation technologies.

Various modifications, in addition to those shown and described herein, will be apparent to those skilled in the art of the above description. Such modifications are also intended to fall within the scope of the disclosure.

It is appreciated that all reagents are obtainable by sources known in the art unless otherwise specified.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

The invention claimed is:

1. A chemically or electrochemically pre-lithiated cathode for use in an electrochemical cell comprising:
    a pre-lithiated cathode active material wherein the cathode active material comprises the chemical formula: $Li_{1+a}M_xO_y$, and is made by chemically or electrochemically pre-lithiating an as synthesized lithium containing cathode active material prior to assembly into an electrochemical cell, where
    $0<a\leq1$,
    $0<x$,
    $2\leq y\leq6$, and
    M is one or more elements selected from the group consisting of one or more transition metals, Al, B, Mg, and combinations thereof.

2. The chemically or electrochemically pre-lithiated cathode of claim 1 wherein $0.02<a\leq1$.

3. The chemically or electrochemically pre-lithiated cathode of claim 1 wherein the pre-lithiated cathode active material comprises the chemical formula: $Li_{1+a}Ni_xCo_yMn_zO_2$, where,
    $0<a\leq1$,
    $0\leq x\leq1$,
    $0\leq y\leq1$,
    $0\leq z\leq1$, and wherein at least one of x, y, or z is non-zero.

4. The chemically or electrochemically pre-lithiated cathode of claim 1 wherein the pre-lithiated cathode has a substantially spinel structure.

5. The chemically or electrochemically pre-lithiated cathode of claim 1 wherein the pre-lithiated cathode has a substantially layered structure.

6. The chemically or electrochemically pre-lithiated cathode of claim 5 wherein the layered structure is an $\alpha$-$NaFeO_2$ structure.

7. The chemically or electrochemically pre-lithiated cathode of claim 1 wherein the cathode active material is described by the general formula: $Li_{1+a}D_vNi_xCo_yMn_zA_wO_2$ where,
    $0<a\leq1$,
    $0\leq x\leq1$,
    $0\leq y\leq1$,
    $0\leq z\leq1$,
    $0\leq w\leq0.15$,
    $0\leq v\leq0.10$, where at least one of x, y, or z is non-zero,
    A is one or more elements selected from the group comprising Sc, Ti, V, Cr, Fe, Cu, Zn, Al, Ga, Ge, As, B, and Mg, and
    D is one or more elements selected from the group consisting Be, Na, Mg, K, Ca, Sr, Ni, Co, Mn, Sc, Ti, V, Cr, Fe, Cu, Zn, Al, Ga, Ge, B, and As.

8. The chemically or electrochemically pre-lithiated cathode of claim 7 wherein the cathode active material has a gradient in Co, Mn, or both.

9. The chemically or electrochemically pre-lithiated cathode of claim 1 wherein a thermodynamic potential of the pre-lithiated cathode is less than 3.0 V versus Li.

10. An electrochemical cell comprising:
    the chemically or electrochemically pre-lithiated cathode of claim 1,
    an anode,
    a separator, and
    a lithium-ion conducting electrolyte.

11. A process of producing the pre-lithiated cathode of claim 1 comprising:
    contacting a cathode active material to an electrolyte, the electrolyte further contacting a counter electrode lithium source; and
    applying an electric potential or current to the cathode active material and the lithium source to increase the lithium content of the cathode active material thereby pre-lithiating the cathode active material with lithium.

12. The process of claim 11 wherein step of contacting is performed by a reel-to-reel process comprising drawing a web of cathode active material coated onto a conducting substrate through an electrolyte bath at a pre-lithiation speed.

13. The process of claim 11 wherein the lithium source is selected from the group consisting of spinels, olivines, silicates, $Li_2MnO_3$, or Li metal.

14. The process of claim 11 wherein a current density of the step of applying is 0.2-20 $mA/cm^2$, optionally 10 $mA/cm^2$.

15. The process of claim 11 further comprising rinsing the pre-lithiated cathode active material.

16. The process of claim 11 further comprising drying the pre-lithiated cathode active material.

17. The process of claim 11 wherein the pre-lithiated cathode is characterized by a first charge capacity greater than a control otherwise identical non-prelithiated cathode.

18. The process of claim 17 wherein the first charge capacity is 10 mAh/g or greater relative to the control.

19. The process of claim 11
    i) wherein the pre-lithiated cathode comprises the chemical formula: $Li_{1+a}Ni_xCo_yMn_zO_2$, where,
    $0<a\leq1$,
    $0\leq x\leq1$,
    $0\leq y\leq1$, and
    $0\leq z\leq1$ wherein at least one of x, y, or z is non-zero; or ii) wherein the cathode active material comprises the general formula: $Li_{1+a}D_vNi_xCo_yMn_zA_wO_2$, where, $0 < a \leq 1$, $0 \leq x \leq 1$, $0 \leq y \leq 1$, $0 \leq z \leq 1$, $0 \leq w \leq 0.15$, $0 \leq v \leq 0.10$, where at least one of x, y, or z is non-zero, A is one or more elements selected from the group comprising Sc, Ti, V, Cr, Fe, Cu, Zn, Al, Ga, Ge, As, B and Mg, and D is one or more elements selected from the group consisting Be, Na, Mg, K, Ca, Sr, Ni, Co, Mn, Sc, Ti, V, Cr, Fe, Cu, Zn, Al, Ga, Ge, B and As.

20. The process of claim 19 wherein $0.02 < a \leq 1$, optionally wherein $0.5 < a \leq 1$.

21. The process of claim 19 wherein the cathode active material comprises the general formula: $Li_{1+a}D_vNi_xCo_yMn_zA_wO_2$, where, $0 < a \leq 1$, $0 \leq x \leq 1$, $0 \leq y \leq 1$, $0 \leq z \leq 1$, $0 \leq w \leq 0.15$, $0 \leq v \leq 0.10$, where at least one of x, y, or z is non-zero, A is one or more elements selected from the group comprising Sc, Ti, V, Cr, Fe, Cu, Zn, Al, Ga, Ge, As, B and Mg, and D is one or more elements selected from the group consisting Be, Na, Mg, K, Ca, Sr, Ni, Co, Mn, Sc, Ti, V, Cr, Fe, Cu, Zn, Al, Ga, Ge, B and As, and wherein the cathode active material has a gradient in Co, Mn, or both.

* * * * *